(12) United States Patent
Yamaura et al.

(10) Patent No.: US 10,353,623 B2
(45) Date of Patent: Jul. 16, 2019

(54) STORAGE DEVICE, STORAGE CONTROL METHOD, COMPUTER PROGRAM PRODUCT, AND STORAGE SYSTEM

(71) Applicant: Toshiba Memory Corporation, Minato-ku (JP)

(72) Inventors: Takahiro Yamaura, Kawasaki (JP); Tomonori Maegawa, Chuo (JP); Masataka Goto, Yokohama (JP)

(73) Assignee: Toshiba Memory Corporation, Minato-ku (JP)

( * ) Notice: Subject to any disclaimer, the term of this patent is extended or adjusted under 35 U.S.C. 154(b) by 0 days.

(21) Appl. No.: 15/913,949

(22) Filed: Mar. 7, 2018

(65) Prior Publication Data

US 2019/0079694 A1    Mar. 14, 2019

(30) Foreign Application Priority Data

Sep. 13, 2017   (JP) .................................. 2017-175901

(51) Int. Cl.
*G06F 3/06* (2006.01)
*G06F 12/02* (2006.01)
*G06F 12/14* (2006.01)

(52) U.S. Cl.
CPC .......... *G06F 3/0652* (2013.01); *G06F 3/0614* (2013.01); *G06F 3/0679* (2013.01); *G06F 12/0246* (2013.01); *G06F 12/14* (2013.01); *G06F 2212/7205* (2013.01)

(58) Field of Classification Search
None
See application file for complete search history.

(56) References Cited

U.S. PATENT DOCUMENTS

| 9,015,481 | B2* | 4/2015 | Simcoe | H04L 9/3236 713/168 |
| 2006/0188270 | A1* | 8/2006 | Chen | B41J 2/17546 399/12 |
| 2012/0216037 | A1* | 8/2012 | Simcoe | H04L 9/3236 713/168 |
| 2014/0281564 | A1* | 9/2014 | Nagai | G06F 21/445 713/185 |

FOREIGN PATENT DOCUMENTS

| JP | 5-81113 | 4/1993 |
| JP | 2002-175236 | 6/2002 |
| JP | 2004-318545 | 11/2004 |
| JP | 2008-171116 | 7/2008 |

* cited by examiner

*Primary Examiner* — Kevin Verbrugge
(74) *Attorney, Agent, or Firm* — Oblon, McClelland, Maier & Neustadt, L.L.P.

(57) ABSTRACT

According to an embodiment, a storage device includes an acquisition unit, a first generation unit, and an erase unit. The acquisition unit is configured to acquire erase permission notification which is generated based on specific data and first authentication information to authenticate the specific data, and includes a first erase code to erase the specific data and physical area information indicating a physical area of the specific data. The first generation unit is configured to generate a second erase code using the specific data stored in the physical area indicated by the physical area information and the first authentication information. The erase unit is configured to erase data stored in the physical area indicated by the physical area information when the first erase code corresponds to the second erase code.

10 Claims, 14 Drawing Sheets

STORAGE DEVICE, STORAGE CONTROL METHOD, COMPUTER PROGRAM PRODUCT, AND STORAGE SYSTEM

CROSS-REFERENCE TO RELATED APPLICATIONS

This application is based upon and claims the benefit of priority from Japanese Patent Application No. 2017-175901, filed on Sep. 13, 2017; the entire contents of which are incorporated herein by reference.

FIELD

Embodiments described herein relate generally to a storage device, a storage control method, a computer program product, and a storage system.

BACKGROUND

Techniques relating to data preservation have been known. For example, a system, which acquires a digest of data and checks whether the data matches data held in a terminal, has been known. In addition, a system, which erases a file from a storage device when an erase keyword coinciding with a keyword assigned to a file is input, has been known.

Conventionally, however, there is a case where erroneous erasing or erroneous updating of data is performed due to vulnerability of a program operating on a host processor. Thus, conventionally, it is sometimes difficult to preserve data of the storage device.

DETAILED DESCRIPTION

According to an embodiment, a storage device includes an acquisition unit, a first generation unit, and an erase unit.

The acquisition unit is configured to acquire erase permission notification which is generated based on specific data and first authentication information to authenticate the specific data, and includes a first erase code to erase the specific data and physical area information indicating a physical area of the specific data. The first generation unit is configured to generate a second erase code using the specific data stored in the physical area indicated by the physical area information and the first authentication information. The erase unit is configured to erase data stored in the physical area indicated by the physical area information when the first erase code corresponds to the second erase code.

Hereinafter, a storage device, a storage control method, a computer program product, and a storage system will be described in detail with reference to the accompanying drawings.

Figure 1:
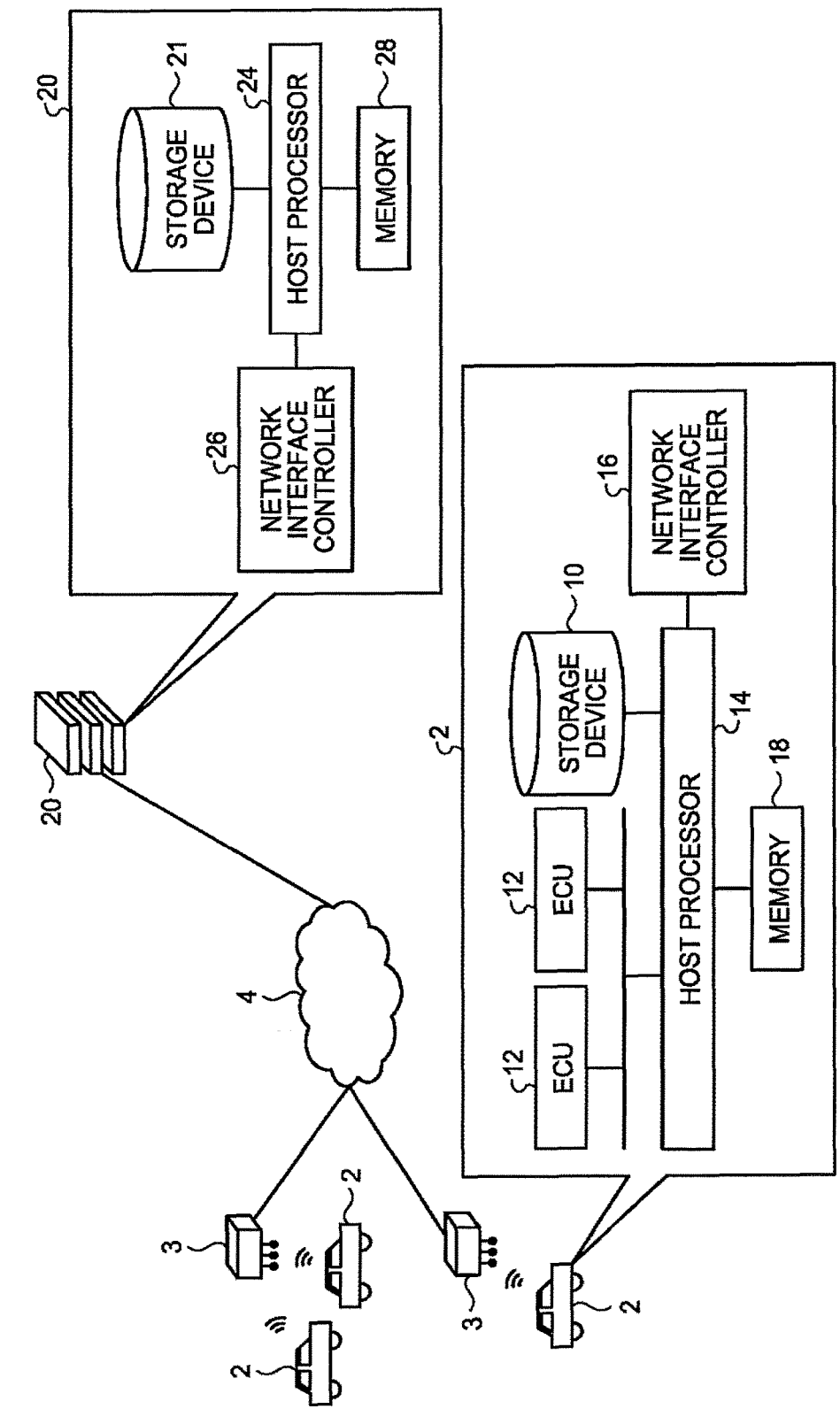
FIG. 1 is a schematic diagram of a storage system.

FIG. 1 is a schematic diagram illustrating an example of a storage system 1 according to the present embodiment.

The storage system 1 includes a server device 20 and a storage device 10. In the present embodiment, the storage device 10 is mounted on a vehicle 2. Thus, the storage system 1 includes the server device 20 and the vehicle 2 in the present embodiment.

Incidentally, the storage device 10 is not limited to the mode of being mounted on the vehicle 2. For example, the storage device 10 may be mounted on a moving body other than the vehicle 2 or a non-moving body.

The vehicle 2 and the server device 20 communicate with the server device 20 via a base station 3 and a network 4. That is, the storage device 10 and the server device 20 are connected to be capable of communicating with each other. The base station 3 relays the vehicle 2 and the server device 20 via the network 4.

The network 4 is a known communication line. The network 4 may be a wired communication network or a wireless communication network. The network 4 is, for example, a local area network (LAN) or the Internet. In the present embodiment, a case where the network 4 is a communication network for wireless communication will be described as an example.

The vehicle 2 includes the storage device 10. In the present embodiment, the vehicle 2 includes the storage device 10, an electronic control unit (ECU) 12, a host processor 14, a network interface controller 16, and a memory 18.

The storage device 10, the network interface controller 16, the memory 18, and the host processor 14 are connected, via a bus, to be capable of communicating with each other. The bus is, for example, PCI Express® or the like.

The ECU 12 is mounted on the vehicle 2 and executes a function as an electronic device to control the vehicle 2. The ECU 12 and the host processor 14 are connected via a network such as a controller area network (CAN) and an in-vehicle Ethernet®. A CAN controller, an in-vehicle Ethernet controller, or the like is used for connection although not illustrated. The ECU 12 outputs data such as data used for control of the vehicle 2 and a log indicating a control result to the host processor 14.

The host processor 14 controls writing of data to the storage device 10, reading of data, and communication with the server device 20. For example, the host processor 14 outputs an instruction to write data output from the ECU 12 to the storage device 10.

The network interface controller 16 communicates with the server device 20 via the network 4. A communication method of the network interface controller 16 is not limited. For example, the communication method is a wireless communication method such as LTE, and 5G. In addition, wireless communication may be performed via an in-vehicle network.

The storage device 10 stores various types of data. The storage device 10 stores data output from the ECU 12 in the present embodiment. Incidentally, the data stored in the storage device 10 is not limited to the data output from the ECU 12

The storage device 10 is realized by, for example, a storage element such as a NAND flash memory. The storage device 10 is, for example, a solid state drive (SSD), an embedded multi-media card (eMMC), a secure digital (SD) card.

The server device 20 manages data stored in the storage device 10. In the present embodiment, the server device 20 includes a storage device 22, a host processor 24, a memory 28, and a network interface controller 26

The storage device 22, the network interface controller 26, the memory 28, and the host processor 24 are connected via a bus to be capable of communicating with each other.

The host processor 24 controls writing of data to the storage device 22, reading of data, and communication with the vehicle 2.

The network interface controller 26 communicates with the vehicle 2 via the network 4. A communication method of the network interface controller 26 is not limited.

The storage device 22 of the server device 20 stores various types of data. The storage device 22 is realized by, for example, a storage element such as a NAND flash memory. The storage device 22 is, for example, an SSD. In addition, a hard disk drive (HDD) may also be used.

Figure 2:
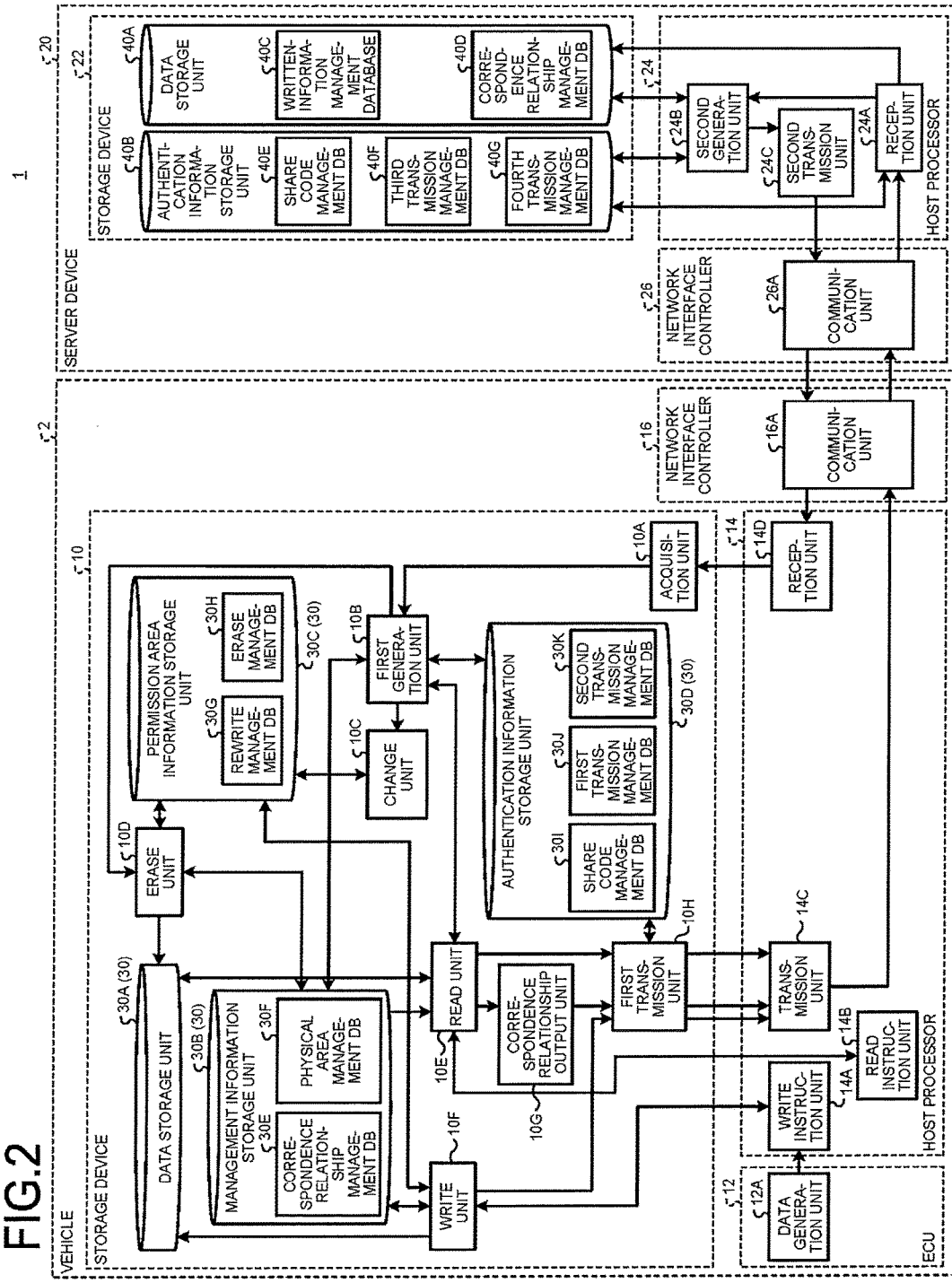
FIG. 2 is a schematic diagram illustrating a functional configuration of the storage system.

Next, a functional configuration of the storage system 1 will be described. FIG. 2 is a schematic diagram illustrating an example of the functional configuration of the storage system 1.

Functional Configuration of Vehicle 2

First, a functional configuration of the vehicle 2 will be described.

The vehicle 2 includes the ECU 12, the host processor 14, the network interface controller 16, and the storage device 10.

The network interface controller 16 includes a communication unit 16A. The communication unit 16A communicates with the server device 20.

The ECU 12 includes a data generation unit 12A. The data generation unit 12A generates data such as data used for control of the vehicle 2 and a log indicating a control result. The data generation unit 12A outputs the generated data to the host processor 14. These pieces of data are used, for example, to analyse an operation status and a cause of failure of the storage device 10.

The host processor 14 includes a write instruction unit 14A, a read instruction unit 14E, a transmission unit 14C, and a reception unit 14D.

Whenever receiving data from the data generation unit 1A, the write instruction unit 14A outputs a write instruction of the received data to the storage device 10. The write instruction includes, for example, an address of a write destination of the storage device 10, a head address of data received from the ECU 12 stored on the memory 18 (see FIG. 1), a data length of the data as a write target, and the like The read instruction unit 14B outputs a read instruction of data, stored in a physical area (to be described later in detail) of the storage device 10, to the storage device 10. The read instruction includes, for example, an address of a read source of the storage device 10, a head address on the memory 18 in which the read data is written, a data length of the data as a read target, and the like.

The transmission unit 14C receives written information and correspondence relationship update information from the storage device 10. The transmission unit 14C transmits the received written information and correspondence relationship update information to the server device 20 via the communication unit 16A.

The written information is information configured to notify the server device 20 of newly written data in a physical area of a data storage unit 30A. The correspondence relationship update information is information configured to notify the server device 20 of an update of a correspondence relationship management DB 30E. Details of the written information and the correspondence relationship update information will be described later.

The reception unit 14D receives erase permission notification or rewrite permission notification from the server device 20 via the communication unit 16A. The reception unit 14D outputs the erase permission notification and the rewrite permission notification to the storage device 10.

The erase permission notification is information configured to notify permission to erase data stored in a specific physical area of the data storage unit 30A. The rewrite permission notification is information configured to notify permission to rewrite logical area information of the correspondence relationship management DB 30E. Details of the erase permission notification and the rewrite permission notification will be described later.

Next, the functional configuration of the storage device 10 will be described. The storage device 10 includes an acquisition unit 10A, a first generation unit 10B, a change unit 10C, an erase unit 10D, a read unit 10E, a write unit 10F, a correspondence relationship output unit 10G, a first transmission unit 10H, and a storage unit 30. The storage unit 30 includes the data storage unit 30A, a management information storage unit 30B, a permission area information storage unit 30C, and an authentication information storage unit 30D.

At least one of the acquisition unit 10A, the first generation unit 10B, the change unit 10C, the erase unit 10D, the read unit 10E, the write unit 10F, the correspondence relationship output unit 10G, the first transmission unit 10H, the management information storage unit 30B, the permission area information storage unit 30C, and the authentication information storage unit 30D is realised by, for example, one or a plurality of processors. For example, each of the above-described units may be realized by causing a processor such as a central processing unit (CPU) to execute a program, that is, by software. Each of the above-described units may be realized by hardware such as a dedicated application specific integrated circuit (ASIC). Each of the above-described units may be realized by using software and hardware in combination. In the case of using a plurality of processors, each processor may realize one of the respective units or may realize two or more of the respective units.

The storage unit 30 stores various types of data. As described above, the storage unit 30 includes the data storage unit 30A, the management information storage unit 30B, the permission area information storage unit 30C, and the authentication information storage unit 30D.

In the present embodiment, the data storage unit 30A is a flash memory (non-volatile memory). The data storage unit 30A is, for example, a NAND flash memory. In the present embodiment, a case where the data storage unit 30A is the NAND flash memory will be described as an example.

The management information storage unit 30B, the permission area information storage unit 30C, and the authentication information storage unit 30D may be volatile memories or non-volatile memories. In the case of using the volatile memory, it is possible to operate the volatile memory as a cache while synchronizing with data with the non-volatile memory.

Incidentally, an example in which the data storage unit 30A, the management information storage unit 30B, the permission area information storage unit 30C, and the authentication information storage unit 30D are configured as separate storage units has been described in the present embodiment. However, at least two or more of the data storage unit 30A, the management information storage unit 30B, the permission area information storage unit 30C, and the authentication information storage unit 30D may be configured as one storage unit.

The data storage unit 30A stores data. In the present embodiment, the data storage unit 30A stores the data received from the ECU 12. Specifically, the management information storage unit 30B stores the correspondence relationship management DB 30E and a physical area management DB 30F.

Figures 3A, 3B:
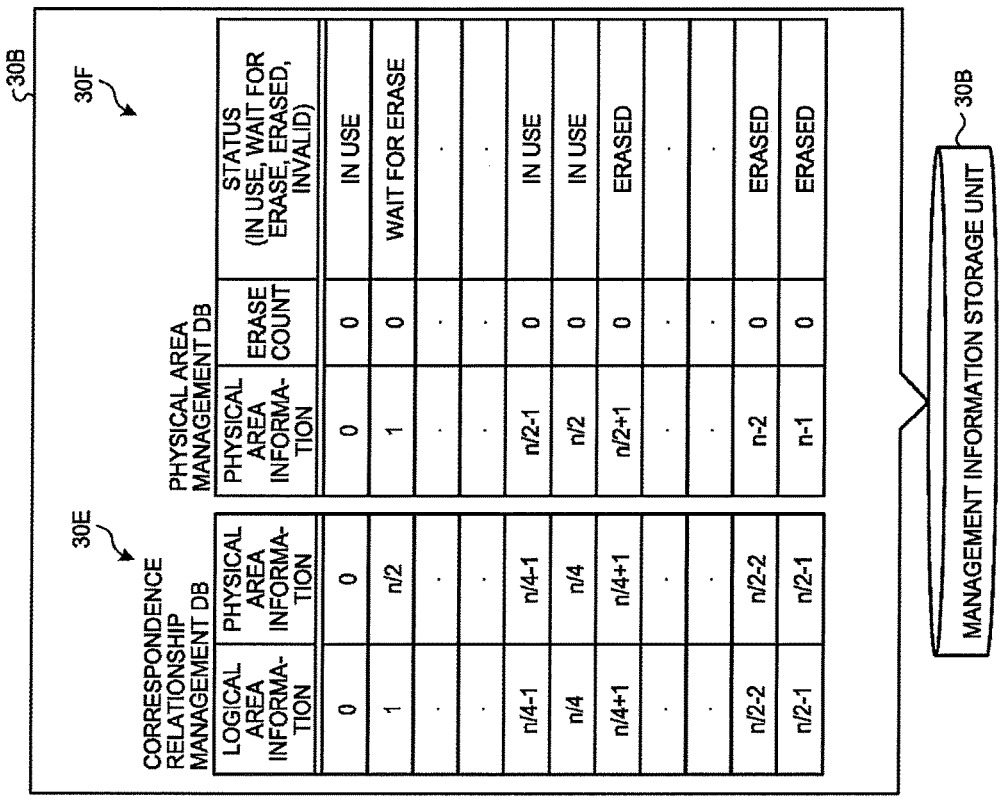
FIGS. 3A and 3B are schematic diagrams of data configurations of a data storage unit and a management information storage unit.

FIGS. 3A and 3B are schematic diagrams illustrating exemplary data configurations of the data storage unit 30A and the management information storage unit 30B.

FIG. 3A is the schematic diagram illustrating the exemplary data configuration of the data storage unit 30A. As described above, the data storage unit 30A is the NAND flash memory in the present embodiment. Thus, the data storage unit 30A is managed for each physical page and each physical block. The physical page is a unit of reading and writing. A physical block is a unit of erasing.

FIG. 3B is the schematic diagram illustrating the exemplary data configurations of the correspondence relationship management DB 30E and the physical area management DB 30F.

The correspondence relationship management DB 30E is a database that indicates a correspondence relationship between physical area information and logical area information. The correspondence relationship indicates a one-to-one relationship between logical area information and physical area information corresponding to the logical area information. That is, the correspondence relationship management DB 30E is a database in which one or a plurality of one-to-one correspondence relationships between the physical area information and the logical area information is registered. Incidentally, a data format of the correspondence relationship management DB 30E is not limited to the database.

The physical area information is information indicating a physical area in which data is stored in the data storage unit 30A. The physical area is, for example, the physical block or the physical page. The physical area information may be information configured to identify the physical area. For example, the physical area information is identification information of the physical block or the physical page. Specifically, the physical area information is a physical block number or a physical page number. Incidentally, the physical block number is also referred to as a physical block address in some cases. In addition, the physical page number is also referred to as a physical page address in some cases.

In the present embodiment, a case where the physical area indicates the physical block and the physical area information indicates the physical block number will be described as an example.

The logical area information is a serial number allocated for each access unit with respect to the data storage unit 30A. The logical area information is, for example, a logical block number or a logical page number. Incidentally, the logical block number is also referred to as a logical block address in some cases. In addition, the logical page number is also referred to as a logical page address in some cases.

In the present embodiment, a case where the logical area information indicates the logical block number will be described as an example.

Here, when writing data to the NAND flash memory, it is difficult to perform overwrite in an area where data has been written, and thus, it is necessary to perform a process of erasing stored data in units of blocks and then newly writing data in an erased area. Thus, the data storage unit 30A is configured using the NAND flash memory having a larger capacity than the capacity storable as the storage device 10. When writing data, it is necessary to update physical area information corresponding to logical area information in the correspondence relationship management DB 30E to physical area information of a physical area in which the data has been newly written. Thus, the correspondence relationship management DB 30E is appropriately updated by a functional unit (to be described later) of the storage device 10.

Next, the physical area management DB 30F will be described. The physical area management DB 30F is a database configured to manage a state of a physical area. In the present embodiment, the physical area management DB 30F is a database in which physical area information, an erase count, and a status are associated with each other. Incidentally, a data format of the physical area management DA 30F is not limited to the database.

The erase count is the number of times of erasing data stored in the physical area indicated by the corresponding physical area information. The erase count is used for wear-leveling and the like.

The status indicates a status e physical area indicated by the corresponding physical area information. The status is represented by any one of "in use", "wait for erase", "erased", and "invalid".

The status "in use" indicates a state where the corresponding physical area information is associated with logical area information in the correspondence relationship management DB 30E. In other words, the status "in use" indicates that the corresponding physical area information is in use.

The status "wait for erase" indicates that the data of the physical area indicated by the corresponding physical area information is the erase target. In other words, the status "wait for erase" indicates that the physical area indicated by the corresponding physical area information is in a state of waiting for erase of data.

The status "erased" indicates that the data in the physical area indicated by the corresponding physical area information has been erased. In other words, the status "erased" indicates that the physical area indicated by the corresponding physical area information is in a state where new data can be written therein.

The status "invalid" indicates that the physical area indicated by the corresponding physical area information is invalid. Thus, the physical area indicated by the physical area information corresponding to the status "invalid" is excluded from write targets of new data.

The physical area management DB 30F is updated by a process to be described later of the storage device 10.

The description will continue returning to FIG. 2. Next, the permission area information storage unit 30C will be described. The permission area information storage unit 30C stores information configured to manage rewrite permission and erase permission relating to a physical area. In the present embodiment, the permission area information storage unit 30C stores a rewrite management DB 30G and an erase management DB 30H.

Figure 4:
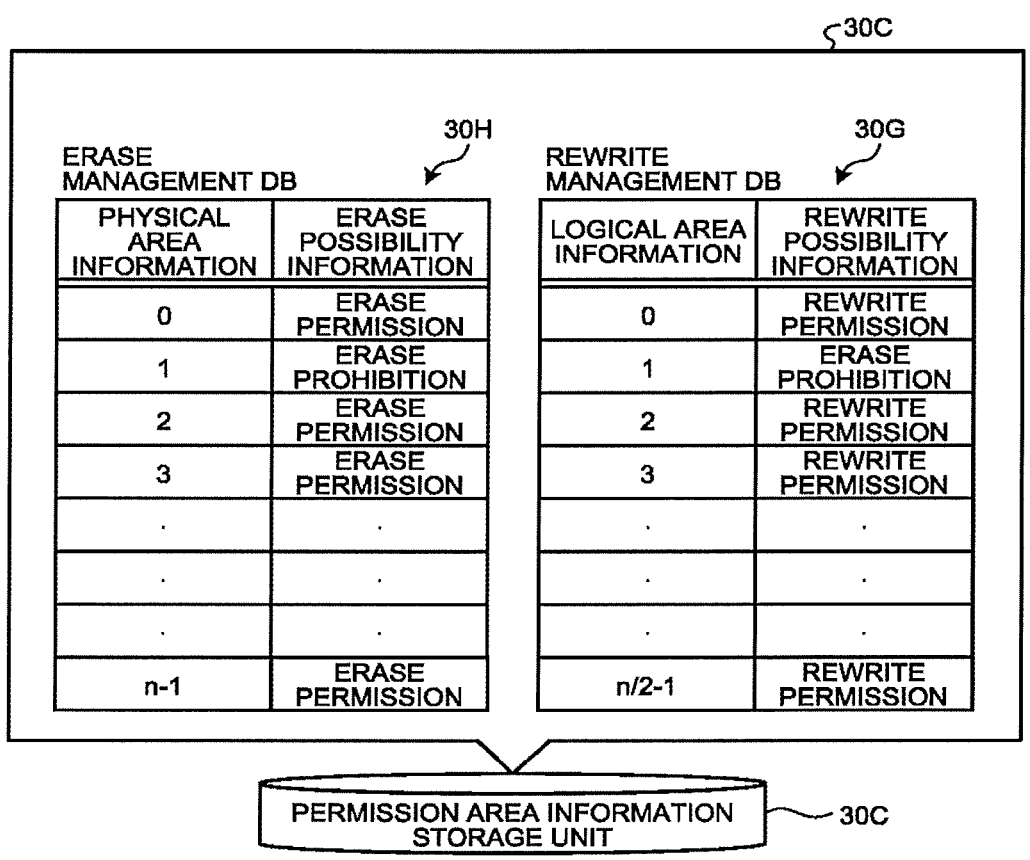
FIG. 4 is a schematic diagram of data configurations of rewrite management and erase management.

FIG. 4 is a schematic diagram illustrating exemplary data configurations of the rewrite management DB 30G and the erase management DB 30H.

The rewrite management DB 30G is a database configured to manage whether to permit rewriting of physical area information corresponding to logical area information in the correspondence relationship management DB 30E (see FIG. 3B). Incidentally, a data format of the rewrite management DB 30G is not limited to the database.

In the present embodiment, the rewrite management DB 30G is a database in which logical area information and rewrite possibility information are associated with each other.

The rewrite possibility information is information indicating whether to permit rewriting of physical area information in the correspondence relationship illustrated in the correspondence relationship management DB 30E. In other words, the rewrite possibility information is information indicating whether to permit rewriting of physical area information which corresponds to the corresponding logical area information. The rewrite possibility information indicates rewrite permission or rewrite prohibition.

The "rewrite permission" indicates to permit rewriting of the physical area information associated with the corresponding logical area information. That is, the physical area information in the correspondence relationship management DB 30E, which is associated with the logical area information corresponding to the rewrite possibility information "rewrite permission" in the rewrite management DB 30G, indicates a state where rewriting is permitted.

The "rewrite prohibition" indicates to prohibit rewriting of the physical area information associated with the corresponding logical area information. That is, the physical area information in the correspondence relationship management DB 30E, which is associated with the logical area information corresponding to the rewrite possibility information "rewrite permission" in the rewrite management DB 30G, indicates a state where rewriting is prohibited.

The rewrite management DB 30G is updated by a process to be described later of the storage device 10.

The erase management DB 30H is a database configured to manage whether to permit erasing of data in the physical area indicated by the physical area information. Incidentally, a data format of the erase management DR 30H is not limited to the database.

In the present embodiment, the erase management DB 30H is a database in which physical area information and erase possibility information are associated with each other.

The erase possibility information is information indicating whether to permit erasing of data in the physical area indicated by the corresponding physical area information. The erase possibility information indicates erase permission or erase prohibition.

The "erase permission" indicates to permit erasing of data in the physical area indicated by the corresponding physical area information. The "erase prohibition" indicates to prohibit erasing of data in the physical area indicated by the corresponding physical area information.

The erase management DB 30H is updated by a process to be described later of the storage device 10.

The description will continue returning to FIG. 2. Next, the authentication information storage unit 30D will be described. The authentication information storage unit 30D stores first authentication information and second authentication information.

The first authentication information includes at least one of a transmission count of written information to the server device 20 and a share code assigned in advance to the storage device 10. The second authentication information includes at least one of a transmission count of rewritten information to the server device 20 and a share code assigned in advance to the storage device 10. These pieces of authentication information will be described later in detail.

Specifically, the authentication information storage unit 30D stores a share code management DB 30I, a first transmission management DB 30J, and a second transmission management DB 30K in the present embodiment.

Figure 5:
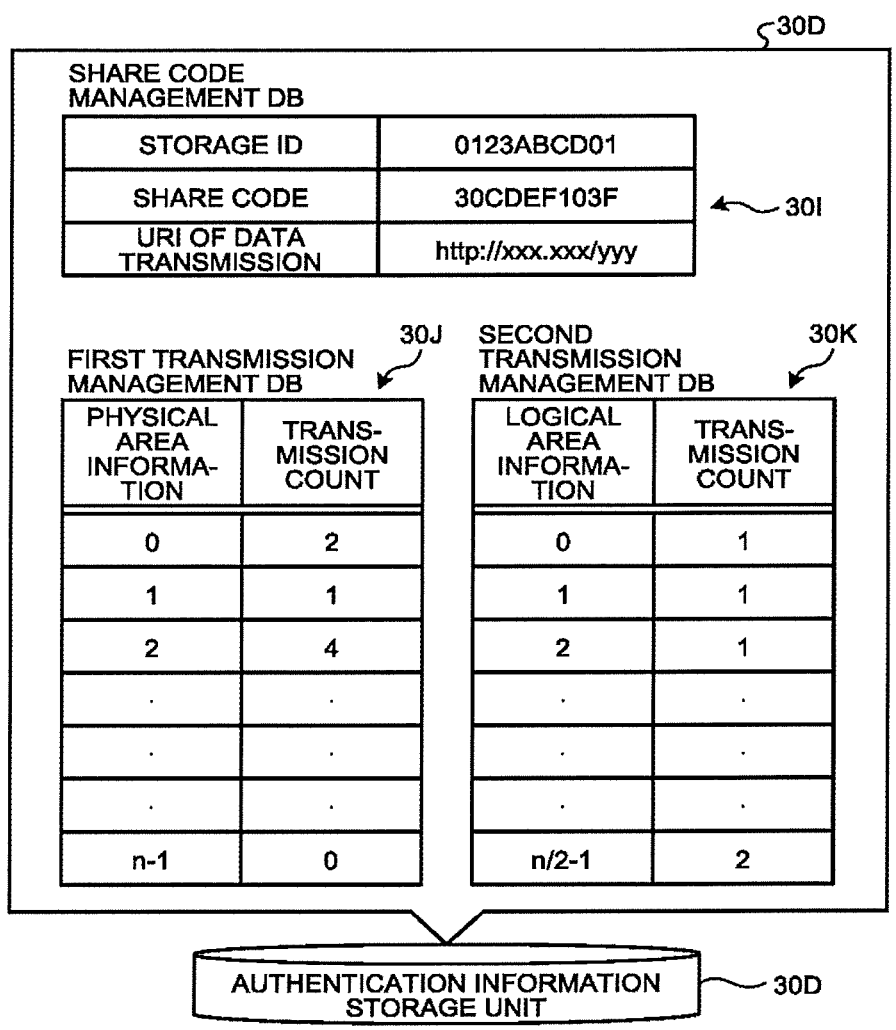
FIG. 5 is a schematic diagram of data configurations of a share code management DB, a first transmission management DB, and a second transmission management DB.

FIG. 5 is a schematic diagram illustrating exemplary data configurations of the share code management DB 30I, the first transmission management DB 30J, and the second transmission management DB 30K.

The share code management DB 30I is a database configured to manage a share code. Incidentally, a data format of the share code management DB 30I is not limited to the database. The share code management DB 30I manages a storage ID, a share code, and a uniform resource identifier (URI) of data transmission in association with each other.

The storage ID is identification information of the storage device 10. The storage ID is constituted by, for example, a vendor ID and a manufacturing number.

The share code is a code shared when performing authentication processing with the server device 20. The share code is, for example, a shared key or a secret key.

The URI for data transmission indicates a destination to which the storage device 10 transmits various types of data such as written information, and correspondence relationship update information. In the present embodiment, the URI of data transmission indicates a destination of the server device 20. The destination may be, for example, mail address.

The share code management DB 30I is stored in advance in the authentication information storage unit 30D, for example, at the time of manufacturing the storage device 10.

The first transmission management DB 30J manages information relating to transmission of written information from the storage device 10 to the server device 20. In the present embodiment, the first transmission management DB 30J is a database in which physical area information and a transmission count are associated with each other. Incidentally, a data format of the first transmission management DB 30J is not limited to the database.

The "transmission count" in the first transmission management DB 30J indicates the number of times of transmission of the written information including the corresponding physical area information to the server device 20.

The first transmission management DB 30J is updated by a process to be described later of the storage device 10.

The second transmission management DB 30K manages information relating to transmission of correspondence relationship information from the storage device 10 to the server device 20. In the present embodiment, the second transmission management DB 30K is a database in which logical area information and a transmission count are associated with each other. Incidentally, a data format of the second transmission management DB 30K is not limited to the database.

The "transmission count" in the second transmission management DB 30K indicates the number of times of transmission of the correspondence relationship information including the corresponding logical area information to the server device 20.

The second transmission management DB 30K is updated by a process to be described later of the storage device 10.

The description will continue returning to FIG. 2.

The write unit 10F receives the write instruction from the write instruction unit 14A of the host processor 14. Then, the write unit 10F executes a process of writing data to the data storage unit 30A based on the received write instruction.

In detail, the write unit 10F executes a write process of writing data as a write target indicated by the write instruction into the data storage unit 30A. As described above, the write instruction includes, for example, the address of the storage device 10 as the write destination, the head address of the data on the memory 18, the data length of the data as the write target, and the like. The data on the memory 18 is the data as the write target.

First, the write unit 10F calculates logical area information corresponding to the address of the storage device 10 as the write destination included in the write instruction. Then, the write unit 10F determines whether physical area information corresponding to the calculated logical area information in the correspondence relationship management DB 30E (see FIG. 3B) is rewritable.

In detail, the write unit 10F determines whether the rewrite possibility information corresponding to the calculated logical area information in the rewrite management DB 30G indicates "rewrite permission". With this determination, the write unit 10F determines whether the physical area information corresponding to the logical area information in the correspondence relationship management DB 30E is rewritable.

Then, when it is determined that the physical area information is rewritable, the write unit 10F determines whether there is an "erased" physical area. The write unit 10F performs this determination by determining whether the physical area information associated with the status "erased" is registered in the physical area management DB 30F (see FIG. 3B).

When it is determined that there is a physical area with the status "erased", the write unit 10F selects one physical area information associated with the status "erased" from the physical area management DB 30F. Then, the write unit 10F writes the write target data in a physical area indicated by the selected physical area information in e data storage unit 30A.

In this manner, when the rewrite possibility information of the physical area information corresponding to the logical area information of the write target data indicates the rewrite permission, the write unit 10F writes this data in the physical area of the physical area information.

At this time, there are a case where writing normally ends and a case where writing abnormally ends. For example, when writing data, the write unit 10F reads the written data once, compares the written data with data before being written, and determines whether both pieces of data match each other. Then, when it is determined that the both pieces of data match each other, the write unit 10F determines that the writing has normally ended. On the other hand, when a state of mismatch has occurred a predetermined number of times or more, the write unit 10F determines that the writing has abnormally ended.

When the writing has abnormally ended, the write unit 10F sets a status, which corresponds to the physical area information of the physical area in which the writing has abnormally ended in the physical area management DB 30F (see FIG. 3B), to "invalid". Thus, the physical area in which the writing has abnormally ended is not subject to subsequent writing.

When the writing is normally ended, the write unit 10F changes the status corresponding to the physical area information of the physical area in which data has been written in the physical area management DB 30F (see FIG. 3B) to "in use".

Then, the write unit 10F rewrites the physical area information corresponding to the logical area information used to write the data in the correspondence relationship management DB 30E (see FIG. 3B) with the physical area information of the physical area in which the data has been written.

That is, the write unit 10F rewrites the physical area information corresponding to the logical area information used to write the data in the correspondence relationship between the logical area information and the physical area information registered in the correspondence relationship management DB 30E with the physical area information of the physical area in which the data has been written.

Then, the write unit 10F sets the erase possibility information corresponding to the physical area information of the physical area in which the data has been written in the erase management DB 30H (see FIG. 4) to "erase prohibition". In addition, the write unit 10F sets the rewrite possibility information corresponding to the logical area information used to write the data in the rewrite management DB 30G to "rewrite prohibition".

Then, the write unit 10F sets the status of the physical area information, associated with the logical area information used for the current writing of data in previous time (before the current writing), in the physical area management DB 30F (see FIG. 3B) to "wait for erase".

Then, the write unit 10F notifies the first transmission unit 10H of an instruction to transmit the written information and the correspondence relationship update information. The transmission instruction includes, for example, physical area information of the physical area in which data has been written, the logical area information corresponding to the physical area information, the written data, and the like.

In addition, the write unit 10F notifies the write instruction unit 14A of the host processor 14 of write completion.

As described above, the write unit 10F executes the write process. With this write process, when the rewrite possibility information of the physical area information corresponding to the logical area information of the write target data indicates the rewrite permission, the write unit 10F writes this data in the physical area of the physical area information. In addition, the write unit 10F rewrites the physical area information corresponding to the logical area information in the correspondence relationship with the physical area information of the physical area in which the data has been written.

When receiving the transmission instruction from the write unit 10F, the first transmission unit 10H executes a transmission process. The transmission process is a process of transmitting the written information and the correspondence relationship update information to the server device 20. The first transmission unit 10H transmits the written information and the correspondence relationship update information to the server device 20 via the transmission unit 14C and the communication unit 16A.

The written information is information configured to notify the server device 20 of newly written data in a physical area of a data storage unit 30A. The written information includes a storage ID, physical area information, a transmission count of the written information, and data written in a physical area indicated by the physical area information. Incidentally, if a storage ID is included in first written information in a case where the first transmission unit 10H performs transmission to the server device 20 using the same connection, written information to be subsequently transmitted does not necessarily include a storage ID. In addition, written information does not necessarily include a storage ID even when the storage ID can be specified by a URI. In addition, the written information may further include a write time or a transmission time.

Specifically, the first transmission unit 10H reads physical area information and data written in a physical area indicated by the physical area information from the transmission instruction received from the write unit 10F.

Incidentally, the first transmission unit 10H may read the physical area information corresponding to the logical area information included in the transmission instruction from the correspondence relationship management DB 30E via the read unit 10E.

The read unit 10E reads various types of information from the data storage unit 30A and the management information storage unit 30B. For example, the read unit 10E performs reading of data stored in each physical area of the data storage unit 30A, reading of correspondence relationship (the correspondence relationship management DB 30E) stored in the management information storage unit 30B and the physical area management DB 30F, and the like.

For example, the first transmission unit 10H outputs a read instruction including logical area information included in the transmission instruction to the read unit 10E. The read unit 10E reads physical area information corresponding to the logical area information included in the received read instruction from the correspondence relationship management DB 30E (see FIG. 3B). Then, the read unit 10E outputs the received logical area information and the read physical area information to the first transmission unit 10H as a correspondence relationship. The first transmission unit 10H may acquire physical area information to be included in written information by reading the physical area information indicated by the correspondence relationship.

In addition, the first transmission unit 10H may read data that has been currently written in the physical area from the data storage unit 30A via the read unit 10E. In this case, the read unit 10E reads physical area information corresponding to the logical area information included in the received read instruction from the correspondence relationship management DB 30E (see FIG. 3B) in the same manner as described above. Then, the read unit 10E reads the data of a physical area indicated by the read physical area information from the data storage unit 30A and outputs the read data to the first transmission unit 10H. As a result, the first transmission unit 10H may read the data written in the physical area.

In addition, the first transmission unit 10H reads the storage ID of the storage device 10 and the transmission count of the written information from the authentication information storage unit 30D. In detail, the first transmission unit 10H reads a transmission count, which corresponds to the physical area information of the physical area in which the data has been currently written, from the first transmission management DB 30J (see FIG. 5) of the authentication information storage unit 30D. In addition, the first transmission unit 10H reads the storage ID from the share code management Db 30I of the authentication information storage unit 30D.

Then, the first transmission unit 10H transmits the written information, which includes the storage ID, the physical area information, the transmission count of the written information, and the data written in the physical area indicated by the physical area information, to the server device 20 via the transmission unit 14C and the communication unit 16A.

A data format of the written information is not limited. The data format of the written information is, for example, extensible markup language (XML), JavaScript object notation (JSON)®, or the like. In addition, for example, hypertext transfer protocol (HTTP) is used as a data transfer method. The first transmission unit 10H may transmit the written information to a destination indicated by the URI of the data transmission stored in the authentication information storage unit 30D. With this process, the first transmission unit 10H transmits the written information to the server device 20. Incidentally, the vehicle 2 and the server device 20 may perform HTTP connection whenever performing communication or may keep the HTTP connection.

When transmitting written information, the first transmission unit 10H increases a transmission count corresponding to physical area information included in the written information by "1" in the first transmission management DB 30J.

Next, the transmission of the correspondence relationship update information will be described.

The correspondence relationship update information is information configured to notify the server device 20 of the update of the correspondence relationship management DB 30E rewritten by the write unit 10F. The correspondence relationship update information includes a storage ID, logical area information, a transmission count of the correspondence relationship update information, and physical area information corresponding to the logical area information.

Incidentally, if a storage ID is included in first written information in a case where the first transmission unit 10H performs transmission the server device 20 using the same connection, correspondence relationship update information to be subsequently transmitted does not necessarily include a storage ID. In addition, written information does not necessarily include a storage ID even when the storage ID can be specified by a URI. In addition, the correspondence relationship update information may further include a write time or a transmission time.

The first transmission unit 10H reads the logical area information from the transmission instruction received from the write unit 10F. In addition, the first transmission unit 10H reads the transmission count and the storage ID of the correspondence relationship update information from the authentication information storage unit 30D. In detail, the first transmission unit 10H reads a transmission count corresponding to the logical area information included in the transmission instruction, from the second transmission management DB 30K of the authentication information storage unit 30D. In addition, the first transmission unit 10H reads the storage ID from the share code management DB 30I of the authentication information storage unit 30D.

Then, the first transmission unit 10H transmits the correspondence relationship update information, which includes the storage ID, the logical area information, the transmission count of the correspondence relationship update information, and the physical area information corresponding to the logical area information, to the server device 20 via the transmission unit 14C and the communication unit 16A.

A data format of the correspondence relationship update information is not limited. The data format of the correspondence relationship update information is, for example, XML, JSON, or the like. In addition, for example, HTTP is used as a data transfer method. Communication may be performed using the same connection as the above-described connection through which the written information has been transmitted.

When transmitting correspondence relationship update information, the first transmission unit 10H increases a transmission count corresponding to logical area information included in the correspondence relationship update information by "1" in the second transmission management DB 30K.

In this manner, the first transmission unit 10H executes the transmission process. That is, the first transmission unit 10H transmits the written information and the correspondence relationship update information to the server device 20 whenever new data is written in the physical area of the data storage unit 30A by the write unit 10F and the physical area information of the correspondence relationship management DB 30E is rewritten.

Incidentally, a communication interface between the first transmission unit 10H and the host processor 14 may be realized using a unique interface or realized by modifying a standard interface such as NVM Express.

Incidentally, the read unit 10E sometimes reads data from the data storage unit 30A according to a read instruction signal received from the read instruction unit 14B. For example, the read instruction signal includes an address of data as a read target. The read unit 10E calculates logical area information from the address included in the read instruction signal. Then, the read unit 10E specifies physical area information corresponding to the calculated logical area information from the correspondence relationship management DB 30E. Then, the read unit 10E reads data included in a physical area indicated by the specified physical area information in the data storage unit 30A, and writes the data in the instructed memory. Then, the read unit 10E may notify the read instruction unit 14B of a signal indicating read completion.

Next, the acquisition unit 10A will be described.

The acquisition unit 10A acquires the erase permission notification and the rewrite permission notification from the server device 20 via the reception unit 14D and the communication unit 16A. A communication interface at the time of this acquisition is, for example, an interface such as standard NVM Express or an interface created independently.

The erase permission notification is information configured to notify permission to erase data stored in a specific physical area of the data storage unit 30A. The erase permission notification includes a storage ID, a first erase code configured to erase specific data, and physical area information indicating a physical area of the specific data. The storage ID is not necessarily included in the erase permission notification such as when communication is performed while keeping connection for each storage. It is because any storage ID to which the erase permission notification corresponds can be specified based on the connection in such a case.

The specific data is data as an erase target stored in the data storage unit 30A.

The first erase code is a code used at the time of erasing the specific data. The first erase code is, for example, a one-time password issued every time specific data is erased. The first erase code is generated based on the specific data and the first authentication information.

The first authentication information is authentication information configured to authenticate specific data. In the present embodiment, the first authentication information includes at least one of a transmission count of written information including the specific data to the server device 20, and a share code assigned in advance to the storage device 10.

Incidentally, the first authentication information may further include other parameters. For example, the first authentication information may further include a server ID, time information, and the like. The time synchronized between the storage device 10 and the server device 20 may be used as the time information.

In the present embodiment, the description is given by exemplifying a case where the first authentication information includes a transmission count of written information including specific data to the server device 20, and the share code assigned in advance to the storage device. Incidentally, the share code is a share code registered in the share code management DB 30I of the authentication information storage unit 30D in the storage device 10.

The first erase code is generated by the server device 20 in the present embodiment. The server device 20 generates the first erase code with a specific algorithm that is predetermined using the specific data which is the erase target data and the first authentication information.

For example, HMAC-Based One-Time Password Algorithm described in RFC 4226 is used as the algorithm when the first erase code is a one-time password. For example, the server device 20 generates the first erase code using a calculation formula illustrated in the following Formula (1).

$$HOTP(K,C)=\text{Truncate}(HMAC\text{-}SHA\text{-}1(K,C)) \quad (1)$$

In Formula (1), K is a value generated using at least one of a share code and specific data. C represents a transmission count of written information including the specific data to the server device 20.

When time synchronization can be performed between the storage device 10 and the server device 20, time information may be further used for K.

The rewrite permission notification is information configured to instruct rewriting of logical area information of the correspondence relationship management DB 30E. The rewrite permission notification includes a storage ID, a first rewrite code, and logical area information corresponding to physical area information as a write target. The storage ID is not necessarily included in the rewrite permission notification such as when communication is performed while keeping connection for each storage. It is because any storage ID to which the rewrite permission notification corresponds can be specified based on the connection in such a case.

The first rewrite code is a code configured to rewrite the rewrite possibility information, which indicates whether to permit rewriting of physical area information, in the correspondence relationship between the physical area information as the rewrite target and the logical area information. Specifically, the first rewrite code is a code used for determination to rewrite the rewrite possibility information of the logical area information corresponding to a physical area as the rewrite target in the rewrite management DB 30G (see FIG. 4) to "rewrite permission".

The first rewrite code is a one-time password issued every time physical area information is rewritten. The first rewrite code is generated based on the physical area information as the rewrite target and the second authentication information in the correspondence relationship management DB 30E.

The second authentication information is authentication information configured to authenticate a correspondence relationship between physical area information as a rewrite target and logical area information. In the present embodiment, the second authentication information includes at least one of a transmission count of correspondence relationship update information including the correspondence relationship (between the physical area information as the rewrite target and the logical area information) to the server device 20 and a share code assigned in advance to the storage device 10.

Incidentally, the second authentication information may further include other parameters. For example, the second authentication information may further include a server ID, time information, and the like. The time synchronized between the storage device 10 and the server device 20 may be used as the time information.

In the present embodiment, the description is given by exemplifying a case where the second authentication information includes a transmission count of correspondence relationship update information, which includes physical area information as a rewrite target and logical area information corresponding to the physical area information, to the server device 20 and a share code assigned in advance to the storage device 10. Incidentally, the share code is a share code registered in the share code management DB 30I of the authentication information storage unit 30D in the storage device 10.

In the present embodiment, the first rewrite code is generated by the server device 20. The server device 20 generates the first rewrite code with a predetermined specific algorithm using the physical area information as the rewrite target and the second authentication information although details thereof will be described later. For example, an algorithm similar to the algorithm of the first erase code may be used as the specific algorithm.

The acquisition unit 10A outputs the acquired erase permission notification and rewrite permission notification to the first generation unit 10B.

When receiving the erase permission notification, the first generation unit 10B generates the second erase code using the specific data stored in the physical area indicated by the physical area information included in the erase permission notification and the first authentication information.

The first generation unit 10B reads the data stored in the physical area, indicated by the physical area information included in the erase permission notification, from the data storage unit 30A as the specific data as an erase target. In the present embodiment, the first generation unit 10B reads the specific data from the data storage unit 30A via the read unit 10E.

In addition, the first generation unit 10B reads the first authentication information from the authentication information storage unit 30D. In the present embodiment, the first generation unit 10B acquires a share code from the share code management DB 30I of the authentication information storage unit 30D. In addition, the first generation unit 10B acquires a transmission count corresponding to the physical area information included in the erase permission notification from the first transmission management DE 30J of the authentication information storage unit 30D. Then, the first generation unit 10B uses the acquired share code and transmission count as the first authentication information.

Incidentally, the server device 20 may transmit erase permission notification further including the first authentication information to the storage device 10. In this case, the first generation unit 10B may read the first authentication information included in the erase permission notification.

Then, the first generation unit 10B generates the second erase code using the specific data and the first authentication information. The first generation unit 10B generates the second erase code with the algorithm used when the server device 20 generates the first erase code. Incidentally, the same algorithm may be predetermined as the algorithm used to generate the erase codes (the first erase code and the second erase code) in the storage device 10 and the server device 20.

Then, the first generation unit 10B determines whether the first erase code included in the erase permission notification acquired from the server device 20 corresponds to the generated second erase code.

The fact that the first erase code corresponds to the second erase code means that these erase codes have a predetermined relationship.

For example, the fact that the first erase code corresponds to the second erase code means that the first erase code and the second erase code have the same value. In addition, for example, the fact that the first erase code corresponds to the second erase code means that a value calculated by a specific algorithm based on the first erase code matches a value calculated by the algorithm based on the second erase code. In addition, the fact that the first erase code corresponds the second erase code means that the first erase code and the second erase code match values recorded in a database in which a correspondence relationship between the first erase code and the second erase code has been stored in advance.

In the present embodiment, the description is given by exemplifying a case where the fact that the first erase code corresponds to the second erase code means that the first erase code and the second erase code have the same value.

When the first erase code corresponds to the second erase code, the change unit 10C changes the erase possibility information, which corresponds to the physical area information included in the erase permission notification in the erase management DB 30H (see FIG. 4), to "erase permission". In addition, the change unit 10C changes the status, which corresponds to the physical area information included in the erase permission notification in the physical area management DB 30F (see FIG. 3B), to "wait for erase".

Then, the first generation unit 10B outputs erasability notification to the erase unit 10D when the first erase code corresponds to the second erase code.

The erase unit 10D erases the data stored in the physical area in which the erase possibility information corresponding to the physical area information is set to "erasable" in the erase management DB 30H (see FIG. 4).

Specifically, the erase unit 10D executes the following erase process.

When receiving the erasability notification from the first generation unit 10B, determination on whether to perform the current erase process is performed, and the erase process is performed if conditions are satisfied. These conditions differ depending on storage devices, and the determination is performed by considering a timing so as not to lower performance of the read or write process that is currently being performed. In addition, the determination may be performed at a timing at which the number of pieces of physical area information indicating "erase permission" reaches a certain number or more. If it is determined to perform the erase process, the erase unit 10D specifies pieces of physical area information with the status "wait for erase" from the physical area management DB 30F (see FIG. 3B). Then, the erase unit 10D specifies physical area information which corresponds to erase possibility information in the erase management DB 30H (see FIG. 4) indicating "erase permission" among the specified pieces of physical area information with the status "wait for erase".

Then, the erase unit 10D erases data stored in physical area indicated by the specified physical area information from the physical area.

The erase unit 10D increases an erase count corresponding to physical area information indicating the erased physical area by "1" in the physical area management DE 30F. In addition, the erase unit 10D changes a status corresponding to the physical area information indicating the erased physical area in the physical area management DB 30F to "erased".

In this manner, the erase unit 10D performs the erase process when receiving the erasability notification from the first generation unit 10B.

On the other hand, when receiving rewrite permission notification from the acquisition unit 10A, the first generation unit 10B generates a second rewrite code using physical area information corresponding to logical area information included in the rewrite permission notification and the second authentication information.

The first generation unit 10B reads the physical area information corresponding to the logical area information included in the rewrite permission notification from the correspondence relationship management DB 30E (see FIG. 3B). In the present embodiment, the first generation unit 10B reads the physical area information via the read unit 10E.

In addition, the first generation unit 10B reads the second authentication information from the authentication information storage unit 30D. In the present embodiment, the first generation unit 10B acquires a share code from the share code management DB 30I of the authentication information storage unit 30D. In addition, the first generation unit 10B obtains a transmission count corresponding to the logical area information included in the rewrite permission notification from the second transmission management DP 30K of the authentication information storage unit 30D. Then, the first generation unit 10B uses the acquired share code and transmission count as the second authentication information.

Incidentally, the server device 20 may transmit rewrite permission notification further including the second authentication information to the storage device 10. In this case, the first generation unit 10B may read the second authentication information included in the rewrite permission notification.

Then, the first generation unit 10B generates the second rewrite code using the read physical area information and second authentication information. The first generation unit 10B generates the second rewrite code with the algorithm used when the server device 20 generates the first rewrite code. Incidentally, the same algorithm may be predetermined as the algorithm used to generate the rewrite codes (the first rewrite code and the second rewrite code) in the storage device 10 and the server device 20.

Then, the first generation unit 103 determines whether the first rewrite code included in the rewrite permission notification acquired from the server device 20 corresponds to the generated second rewrite code.

The fact that the first rewrite code corresponds the second rewrite code means that these rewrite codes have a predetermined relationship.

For example, the fact that the first rewrite code corresponds to the second rewrite code means that the first rewrite code and the second rewrite code have the same value. In addition, for example, the fact that the first rewrite code corresponds to the second rewrite code means that a value calculated by a specific algorithm based on the first rewrite code matches a value calculated by the algorithm based on the second rewrite code. In addition, the fact that the first rewrite code corresponds to the second rewrite code means that the first rewrite code and the second rewrite code match values recorded in a database in which a correspondence relationship between the first rewrite code and the second rewrite code has been stored in advance.

In the present embodiment, the description is given by exemplifying a case where the fact that the first rewrite code corresponds to the second rewrite code means that the first rewrite code and the second rewrite code have the same value.

When the first rewrite code corresponds to the second rewrite code, the change unit 10C changes the rewrite possibility information of the physical area information in the correspondence relationship to the rewrite permission. The "correspondence relationship" indicates a correspondence relationship between the logical area information included in the rewrite permission notification and the physical area information corresponding to the logical area information. That is, the change unit 10C changes the rewrite possibility information corresponding to the logical area information included in the rewrite permission notification in the rewrite management DB 30G (see FIG. 4) to "rewrite permission".

Thus, the physical area information corresponding to the logical area information having the rewrite possibility information changed to "rewrite permission" in the correspondence relationship management DE 30E (see FIG. 3B) is turned into a state where rewrite thereof has been permitted.

Functional Configuration of Server Device 20—The description will continue returning to FIG. 2 Next, a functional configuration of the server device 20 will be described.

The server device 20 includes the storage device 22, the host processor 24, and the network interface controller 26. The storage device 22 and the network interface controller 26 are connected to the host processor 24 to be communicating with each other.

The storage device 22 stores various types of information. In the present embodiment, the storage device 22 stores the data storage unit 40A and the authentication information storage unit 40B.

The data storage unit 40A and the authentication information storage unit 40B are, for example, SSDs or HDDs incorporating flash memories (non-volatile memories), or volatile memories. In the present embodiment, a case where the data storage unit 40A is the SSD will be described as an example. Meanwhile, the authentication information storage unit 40B may be a non-volatile memory or a volatile memory. In the present embodiment, a case where the authentication information storage unit 40B is the volatile memory will be described as an example.

The data storage unit 40A stores written information and correspondence relationship update information received from the storage device 10 in association with a storage ID of the storage device 10 as a transmission source of these pieces of information. The data storage unit 40A stores a written-information management DB 40C and a correspondence relationship management DB 40D for each of the storage devices 10 in the present embodiment.

Figure 6:
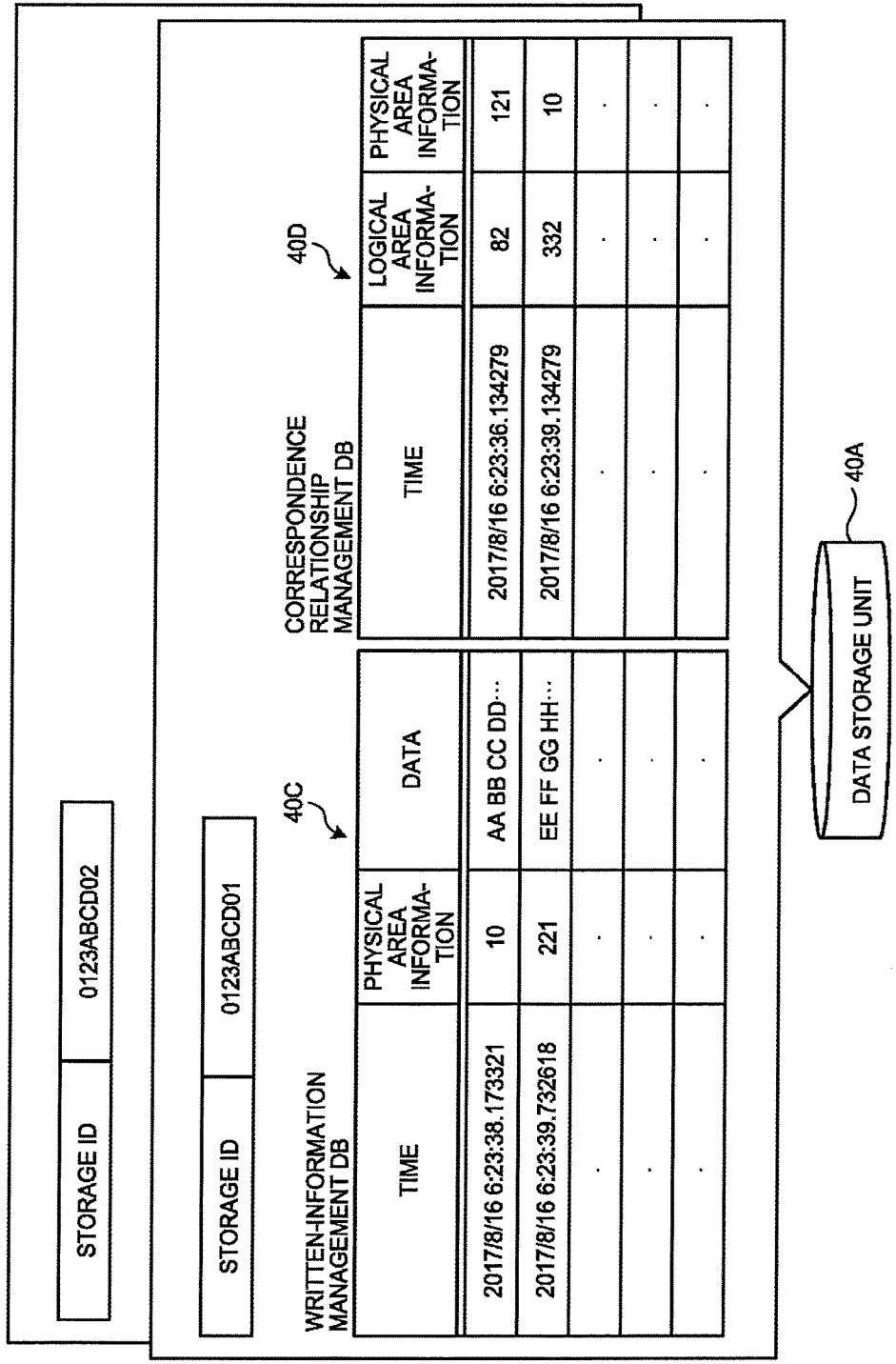
FIG. 6 is a schematic diagram of data configurations of a written-information management DB and a correspondence relationship management DB.

FIG. 6 is a schematic diagram illustrating exemplary data configurations of the written-information management DB 40C and the correspondence relationship management DB 40D.

The written-information management DB 40C is a database configured to manage the written information received from the storage device 10. Incidentally, the data configuration of the written-information management DB 40C is not limited to the database.

The written-information management DB 40C is obtained by associating time, physical area information, and data with each other. The time in the written-information management DB 40C is preferably information with which a reception order with another data can be specified. The time in the written-information management DB 40C is, for example, a reception time of written information. When time information is included in the written information, a time indicated in the time information may be used as the time in the writing management DB 40C.

The physical area information and data in the written-information management DB 40C are physical area information and data included in the written information received at the corresponding time.

The correspondence relationship management DB 40D is a database configured to manage the correspondence relationship update information received from the storage device it. Incidentally, the data configuration of the correspondence relationship management DB 40D is not limited to the database.

The correspondence relationship management DB 40D is obtained by associating time, logical area information, and physical area information with each other. The time in the correspondence relationship management DB 40D is preferably information with which a reception order with another data can be specified. For example, the time in the correspondence relationship management DB 40D is a reception time of correspondence relationship update information. When the correspondence relationship update information includes time information, a time indicated in the time information may be used as the time in the correspondence relationship management DB 40D.

The logical area information and physical area information in the correspondence relationship management DB 40D are logical area information and physical area information included in the correspondence relationship update information received at the corresponding time.

The written-information management DB 40C and the correspondence relationship management DB 40D are additionally written by the host processor 24 whenever the written information and the correspondence relationship update information are received from the storage device 10.

The description will continue returning to FIG. 2. Next, the authentication information storage unit 40B will be described. The authentication information storage unit 40B stores authentication information. In the present embodiment, the authentication information storage unit 40B stores a share code management DB 40E, a third transmission management DB 40B, and a fourth transmission management DB 40G for each of the storage devices 10.

Figure 7:
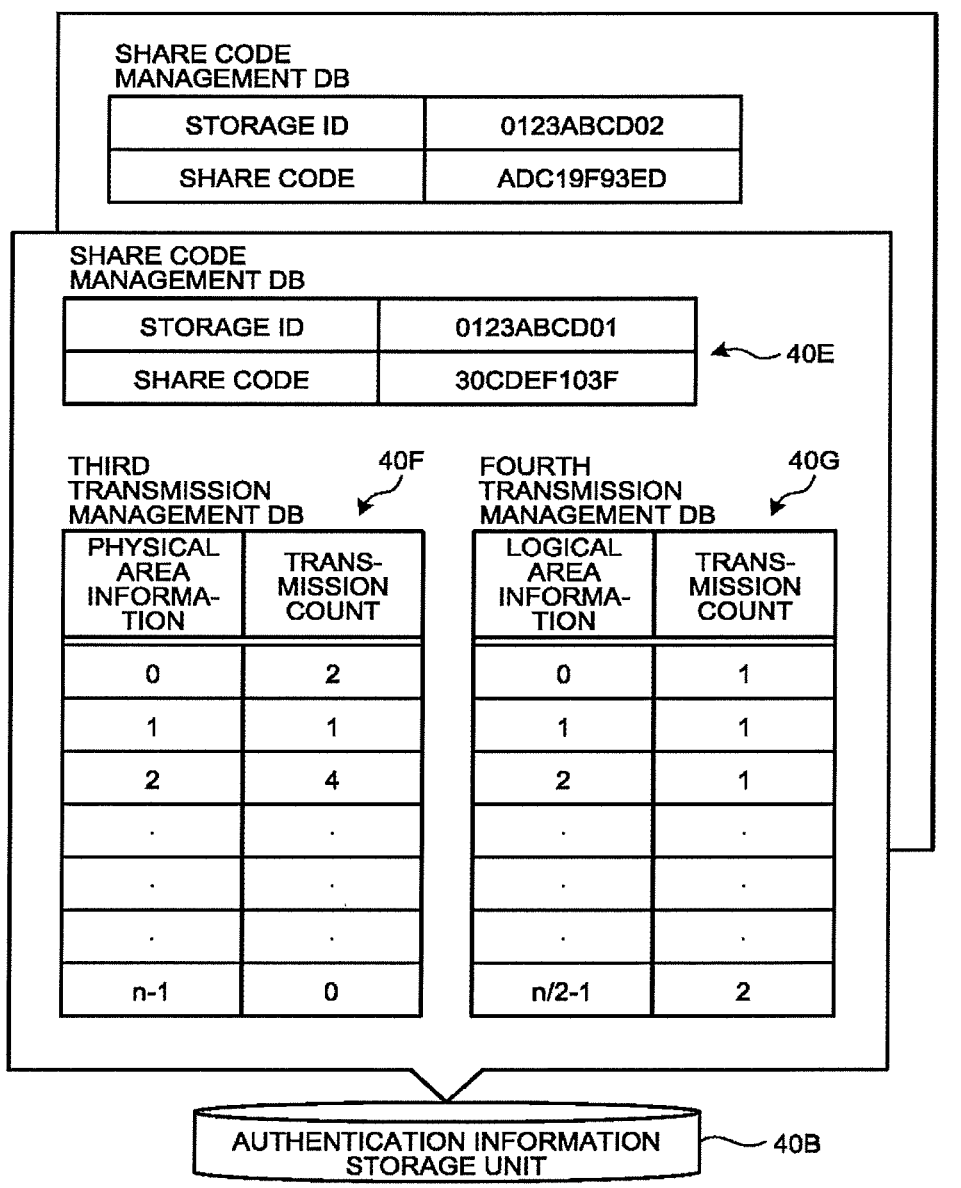
FIG. 7 is a schematic diagram of data configurations of a share code management DB, a third transmission management DB, and a fourth transmission management DB.

FIG. 7 is a schematic diagram illustrating exemplary data configurations of the share code management DB 40E, the third transmission management DB 40F, and the fourth transmission management DB 40G. As illustrated in FIG. 7, the authentication information storage unit 40B stores the share code management DB 40E, the third transmission management DB 40F, and the fourth transmission management DB 40G for each of the storage devices 10.

The share code management DB 40E is a database configured to manage a share code shared with the corresponding storage device 10. Incidentally, a data format of the share code management DB 40E is not limited to the database. The share code management DB 40E indicates the storage ID and the share code. Since the definition of the share code has been described above, the description thereof will be omitted here.

The third transmission management DB 40F manages information relating to the written information received from the storage device 10. In the present embodiment, the third transmission management DB 40F is a database in which physical area information and a transmission count are associated with each other. Incidentally, a data format of the third transmission management DB 40F is not limited to the database.

The "transmission count" in the third transmission management DB 40F indicates the number of times of reception of the written information including the corresponding physical area information from the storage device 10.

The fourth transmission management DB 40G manages information relating to the correspondence relationship update information received from the storage device 10. In the present embodiment, the fourth transmission management DE 40G is a database in which logical area information and a transmission count are associated with each other. Incidentally, a data format of the fourth transmission management DB 40G is not limited to the database.

The "transmission count" in the fourth transmission management DB 40G indicates the number of times of reception of the correspondence relationship information including the corresponding logical area information from the storage device 10.

It is assumed that the share code management DB 40E is stored in advance. The third transmission management DB 40F and the fourth transmission management DB 40G are updated by the processing of the host processor 24 (to be described in detail later).

Next, the network interface controller 26 will be described returning to FIG. 2. The network interface controller 26 includes a communication unit 26A. The communication unit 26A communicates with the storage device 10. In the present embodiment, the communication unit 26A communicates with the storage device 10 via the network interface controller 16 of the vehicle 2 and the host processor 14.

Specifically, the communication unit 26A receives the written information and the correspondence relationship update information from the storage device 10. The communication unit 26A outputs the received written information and correspondence relationship update information to the host processor 24. In addition, the communication unit 26A receives the erase permission notification and the rewrite permission notification from the host processor 24. Then, the communication unit 26A transmits the received erase permission notification and rewrite permission notification to the storage device 10.

The host processor 24 performs management of data stored in the storage device 22, control of transmission of various information to the storage device 10, and the like.

The host processor 24 includes a reception unit 24A, a second generation unit 24B, and a second transmission unit 24C.

The reception unit 24A receives the written information and the correspondence relationship information from the storage device 10 via the communication unit 26A.

When receiving the written information, the reception unit 24A determines whether a transmission count of written information included in the written information matches a corresponding transmission count managed by the storage device 22.

Specifically, the reception unit 24A specifies the third transmission management DB 40F (see FIG. 7) corresponding to the storage ID included in the received written information. Then, the reception unit 24A reads a transmission count corresponding to physical area information included in the received written information in the specified third transmission management DB 40F. The reception unit 24A uses the read transmission count as the corresponding transmission count managed by the storage device 22.

Then, when the transmission count of the written information included in the written information matches the corresponding transmission count managed by the storage device 22, the reception unit 24A stores the written information In the data storage unit 40A of the storage device 22.

Specifically, the reception unit 24A specifies the written-information management DB 40C, associated with the storage ID included in the written information received from the storage device 10, in the data storage unit 40A. Then, the reception unit 24A registers a time at which the written information is received and the physical area information and data included in the written information in the specified written-information management DB 40C in association with each other. Incidentally, the reception unit 24A may further register at least one of a size of the physical area information and a size of the data in the written-information management DB 40C in association with each other.

Meanwhile, when receiving the correspondence relationship update information, the reception unit 24A determines whether a transmission count of correspondence relationship update information included in the correspondence relationship update information matches a corresponding transmission count managed by the storage device 22.

Specifically, the reception unit 24A specifies the fourth transmission management DB 40G (see FIG. 7) corresponding to the storage ID included in the received correspondence relationship update information. Then, the reception unit 24A reads a transmission count corresponding to logical area information included in the received correspondence relationship update information in the specified fourth transmission management DB 40G. The reception unit 24A uses the read transmission count as the corresponding transmission count managed by the storage device 22.

Then, when the transmission count of the correspondence relationship update information included in the correspondence relationship update information matches the corresponding transmission count managed by the storage device 22, the reception unit 24A stores the correspondence relationship update information in the data storage unit 40A of the storage device 22.

Specifically, the reception unit 24A specifies the correspondence relationship management DB 40D, associated with the storage ID included in the correspondence relationship update information received from the storage device 10, in the data storage unit 40A. Then, the reception unit 24A registers a time at which the correspondence relationship update information is received and the logical area information and physical area information included in the correspondence relationship update information in the specified correspondence relationship management DB 40D in association with each other.

Next, the second generation unit 24B will be described. The second generation unit 24B generates the first erase code and the first rewrite code. That is, the above-described generation of the first erase code and the first rewrite code using the server device 20 is performed by the second generation unit 24B of the server device 20.

First, the generation of the first erase code will be described. The second generation unit 24B generates the first erase code with the specific algorithm that is predetermined using the specific data which is the erase target data and the first authentication information. Since the definitions of the first erase code and the specific algorithm have been described above, the descriptions thereof will be omitted here.

For example, the second generation unit 24B generates the first erase code when receiving written information from the storage device 10. In detail, the second generation unit 24B uses data included in the written information received from the storage device 10 as data (specific data) as an erase target. Incidentally, the second generation unit 24B may read the data from the data storage unit 40A and use the read data as the specific data. Incidentally, the second generation unit 24B may use another arbitrary data as the specific data.

The second generation unit 24B acquires the first authentication information from the authentication information storage unit 40B. For example, the second generation unit 24B specifies a storage ID corresponding to the erase target data from the data storage unit 40A. Then, the second generation unit 24B specifies a share code corresponding to the specified storage ID from the authentication information storage unit 40B.

In addition, the second generation unit 24B specifies physical area information corresponding to the specified storage ID and the erase target data from the data storage unit 40A. Incidentally, the second generation unit 24B may specify the physical area information by reading physical area information included in the written information received from the storage device 10. Then, the second generation unit 24B specifies a transmission count corresponding to the specified physical area information from the third transmission management DB 40B of the authentication information storage unit 40B. Then, the second generation unit 24B uses the specified share code and transmission count as the first authentication information.

Then, the second generation unit 24B generates the first erase code with the predetermined specific algorithm using the specified first authentication information and the specific data which is the erase target data.

Then, the second generation unit 24B generates erase permission notification including the generated first erase code and physical area information. The physical area information included in the erase permission notification is information indicating a physical area in the data storage unit 30A of the storage device 10 in the specific data as a target to be erased using the first erase code. In the present embodiment, the second generation unit 24B may use the physical area information included in the written information received from the storage device 10 as the physical area information included in the erase permission notification.

The second generation unit 24B outputs an instruction to transmit the erase permission notification to the storage device 10 to the second transmission unit 24C. A transmission destination of the erase permission notification is the storage device 10 identified by the storage ID included in the written information which has been used to create the erase permission notification.

Further, the second generation unit 24B increases a transmission count corresponding to the physical area information included in the erase permission notification in the third transmission management DB 40F corresponding to the storage ID by "1" in the authentication information storage unit 40B.

Next, the generation of the first rewrite will be described.

The second generation unit 24B further generates the first rewrite code based on physical area information and the second authentication information configured to authenticate a correspondence relationship between the physical area information and logical area information. The second generation unit 24B generates the first rewrite code with the predetermined specific algorithm using the physical area information and the second authentication information. Since the definitions of the first rewrite code and the specific algorithm have been described above, the descriptions thereof will be omitted here.

For example, the second generation unit 24B generates the first rewrite code when receiving correspondence relationship update information from the storage device 10. Specifically, the second generation unit 24B specifies physical area information included in the correspondence relationship update information received from the storage device 10 as physical area information as a rewrite target.

Then, the second generation unit 24B specifies the second authentication information used to generate the first rewrite code. For example, the second generation unit 24B acquires the second authentication information from the authentication information storage unit 40B. For example, the second generation unit 24B specifies a share code corresponding to a storage ID included in the correspondence relationship update information received from the storage device 10 from the authentication information storage unit 40B.

In addition, the second generation unit 24B specifies a transmission count, which corresponds to the identified storage ID and the logical area information included in the correspondence relationship update information received from the storage device 10, from the fourth transmission management DB 40G (see FIG. 7).

Then, the second generation unit 24B uses the specified share code and transmission count as the second authentication information. The second generation unit 24B generates the first rewrite code with the predetermined specific algorithm using the specified physical area information and second authentication information.

Then, the second generation unit 24B generates rewrite permission notification including the generated first rewrite code and the logical area information corresponding to the physical area information as the rewrite target. The second generation unit 24B may use the logical area information included in the correspondence relationship update information received from the storage device 10 as the logical area information included in the write instruction information.

Then, the second generation unit 24B outputs an instruction to transmit the rewrite permission notification to the storage device 10 to the second transmission unit 24C. A transmission destination of the rewrite permission notification is the storage device 10 identified by the storage ID included in the correspondence relationship update information used to create the rewrite permission notification.

Further, the second generation unit 24B increases a transmission count corresponding to the logical area information included in the write instruction information of the fourth transmission management DB 40G corresponding to the storage ID by "1" in the authentication information storage unit 40B.

The second transmission unit 24C transmits the erase permission notification including the first erase code and the physical area information to the storage device 10. In addition, the second transmission unit 24C transmits rewrite permission notification including the first rewrite code and the logical area information corresponding to the physical area information as the rewrite target to the storage device 10.

In detail, the second transmission unit 24C transmits the erase permission notification received from the second generation unit 24B to the storage device 10 indicated by the transmission instruction via the communication unit 26A. In detail, the second transmission unit 24C transmits the rewrite permission notification received from the second generation unit 24B to the storage device 10 indicated by the transmission instruction via the communication unit 26A.

Next, an exemplary procedure of storage control processing executed by the storage device 10 according to the present embodiment will be described.

in the present embodiment, the storage control processing includes a write process, a transmission process, a read process, an erase/rewrite process, and an erase process.

Figure 8:
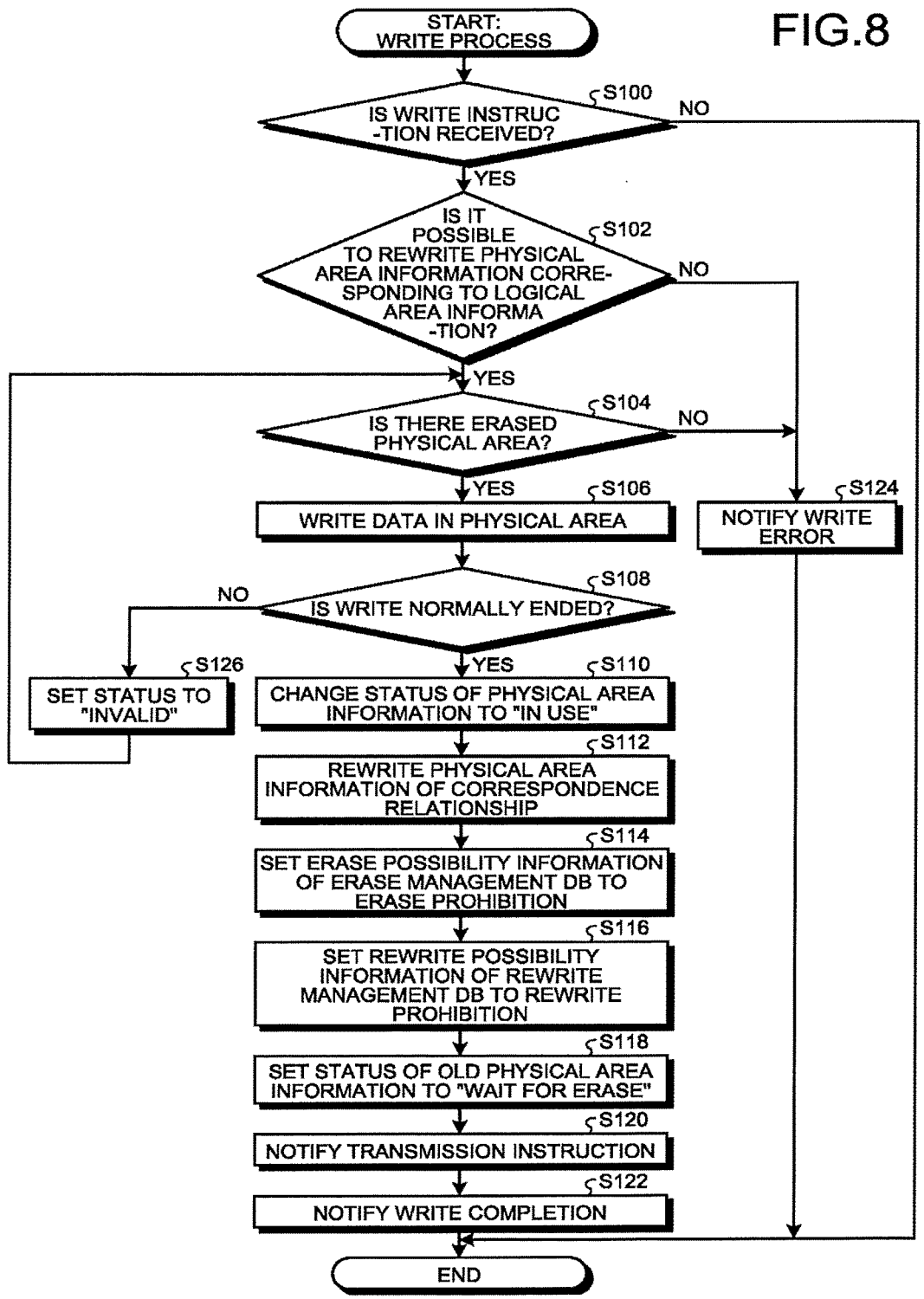
FIG. 8 is a flowchart of a procedure of a write process.

First, the write process executed by the storage device 10 is executed. FIG. 8 is a flowchart illustrating an exemplary procedure of the write process executed by the storage device 10.

First, the write unit 10F determines whether a write instruction is received from the write instruction unit 14A of the host processor 14 (Step S100). When a negative determination is made in Step S100 (Step S100: No), this routine is ended. When it is determined that the write instruction is received (Step S100: Yes), the process proceeds to Step S102.

In Step S102, the write unit 10F determines whether the physical area information corresponding to the logical area information used for writing can be rewritten based on the write instruction received in Step S100 (Step S102). In Step S102, the write unit 10F determines whether the rewrite possibility information corresponding to the logical area information used for writing in the rewrite management DB 30G indicates "rewrite permission". With this determination, the write unit 10F performs the determination of Step S102.

When a negative determination is made in Step S102 (Step S102: No), the process proceeds to Step S124. In Step S124, the write unit 10F notifies the host processor 14 of a data write error (Step S124). Then, this routine is ended.

When an affirmative determination is made in Step S102 (Step S102: Yes), the process proceeds to Step S104. In Step S104, the write unit 10F determines whether there is an "erased" physical area (Step S104). The write unit 10F performs this determination by determining whether the physical area information associated with the status "erased" is registered in the physical area management DB 30F (see FIG. 3B).

When a negative determination is made in Step S104 (Step S104: No), the process proceeds to Step S124. When an affirmative determination is made in Step S104 (Step S104: Yes), the process proceeds to Step S106.

In Step S106, the write unit 10F selects one physical area information associated with the status "erased" from the physical area management DB 30F. Then, the write unit 10F writes the write target data in the physical area indicated by the selected physical area information (Step S106).

Next, the write unit 10F determines whether the writing in Step S106 is normally ended (Step S108). When it is determined that the writing is abnormally ended (Step S106: No), the process proceeds to Step S126. In Step S126, the write unit 10F changes a status, which corresponds to the physical area information of the physical area determined as being abnormally ended in Step S108, in the physical area management DB 30F (see FIG. 3B) to "invalid" (Step S126). Then, the process returns to the above-described Step S104.

On the other hand, when it is determined in Step S108 that the writing is normally ended (Step S108: Yes), the process proceeds to Step S110. In Step S110, the write unit 10F changes a status, which corresponds to the physical area information of the physical area in which the data has been written in Step S106 in the physical area management DB 30F (see FIG. 3B), to "in use" (Step S110).

Next, the write unit 10F rewrites the physical area information corresponding to the logical area information used to write the data in the correspondence relationship management DB 30E (see FIG. 3B) with the physical area information of the physical area in which the data has been written in Step S106 (Step S112).

Next, the write unit 10F sets erase possibility information, which corresponds to the physical area information of the physical area in which the data has been written in Step S106 in the erase management DB 30H (see FIG. 4), to "erase prohibition" (Step S114). Then, the write unit 10F sets rewrite possibility information of logical area information, which corresponds to the physical area information of the physical area in which the data has been written in Step S106 in the rewrite management DB 30G, to "rewrite prohibition" (Step S116).

Then, the write unit 10F sets a status of physical area information, associated with the logical area information used for the writing of data in Step S106 in a previous time (before the current writing), in the physical area management DB 30F (see FIG. 3B) to "wait for erase" (Step S118).

Then, the write unit 10F notifies the first transmission unit 10H of an instruction to transmit the written information and the correspondence relationship update information (Step S120). Next, the write unit 10F notifies the host processor 14 of write completion (Step S122), this routine is ended.

Figure 9:
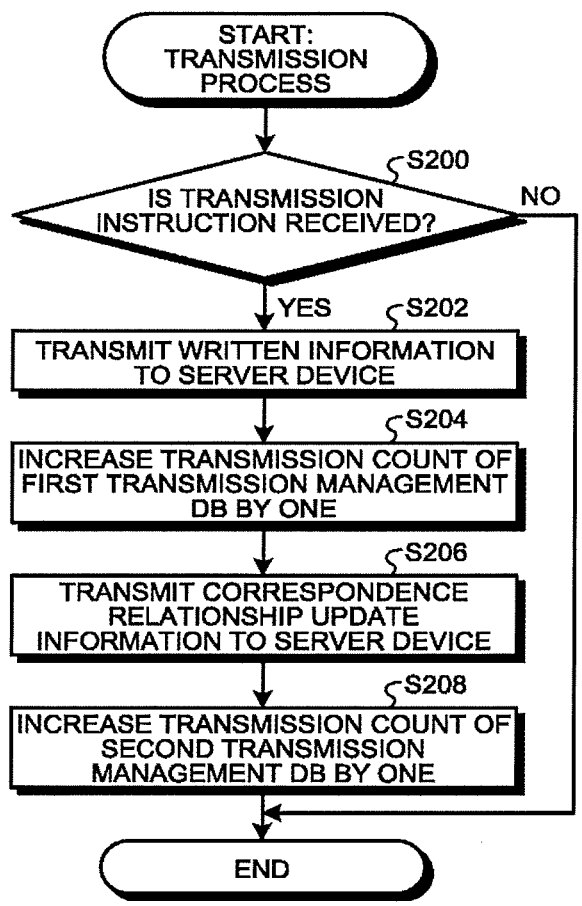
FIG. 9 is a flowchart of a procedure of a transmission process.

Next, an exemplary procedure of the transmission process executed by the first transmission unit 10H will be described. FIG. 9 is a flowchart illustrating the exemplary procedure of the transmission process.

The first transmission unit 10H determines whether a transmission instruction is received from the write unit 10F (Step S200). When a negative determination is made in Step S200 (Step S200: No), this routine is ended. When an affirmative determination is made in Step S200 (Step S200: Yes), the process proceeds to Step S202.

In Step S202, the first transmission unit 10H transmits the written information to the server device 20 (Step S202). The first transmission unit 10H transmits the written information including the storage ID of the storage device 10, the data written in Step S106 (see FIG. 6), the physical area information of the physical area in which the data has been written, and the transmission count of the written information, to the server device 20.

Then, the first transmission unit 10H increases a transmission count corresponding to physical area information included in the written information by "1" in the first transmission management DB 30J (Step S204).

Next, the first transmission unit 10H transmits the correspondence relationship update information to the server device 20 (Step S206). The first transmission unit 10H transmits the correspondence relationship update information including the storage ID of the storage device 10, the physical area information rewritten in Step S112 (see FIG. 8), the logical area information corresponding to the physical area information in the correspondence relationship management DB 30E, and the transmission count of the correspondence relationship update information to the server device 20.

Next, the first transmission unit 10H increases a transmission count corresponding to logical area information included in the correspondence relationship update information by "1" in the second transmission management DB 30K (Step S208). Then, this routine is ended.

Figure 10:
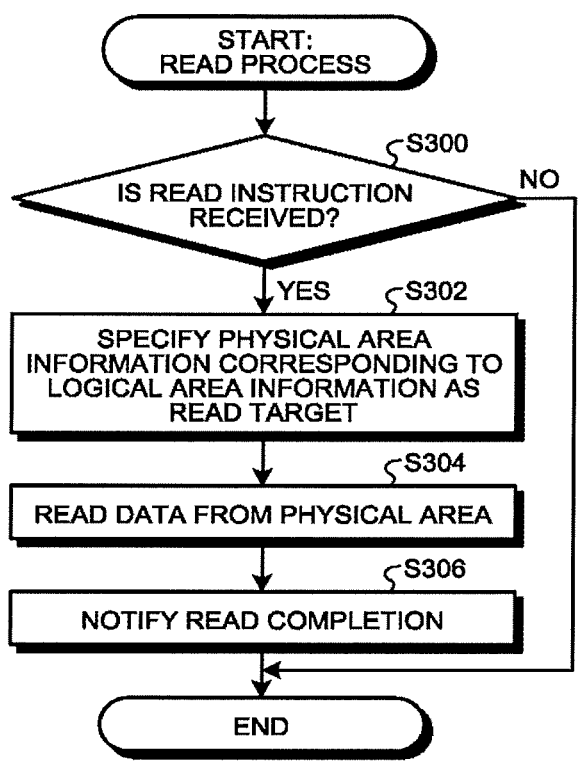
FIG. 10 is a flowchart of a procedure of a read process.

Next, an exemplary procedure of the read process executed by the storage device 10 will be described. FIG. 10 is a flowchart illustrating the exemplary procedure of the read process.

First, the read unit 10E determines whether a read instruction signal is received from the read instruction unit 14B of the host processor 14 (Step S300). When a negative determination is made in Step S300 (Step S300: No), this routine is ended. When an affirmative determination is made in Step 3300 (Step S300: Yes), the process proceeds to Step S302.

In Step S302, the read unit 10E calculates logical area information from the address included in the read instruction signal. Then, the read unit 10E specifies physical area information corresponding to the calculated logical area information from the correspondence relationship management DB 30E (Step S302).

Then, the read unit 10E reads data included in a physical block indicated by the physical area information specified in Step S302 in the data storage unit 30A (Step S304). Then, the read unit 10E writes the read data to the memory instructed by the read instruction. Then, the read unit 10E notifies the host processor 14 of the signal indicating the read completion (Step S306). Then, this routine is ended.

Figure 11:
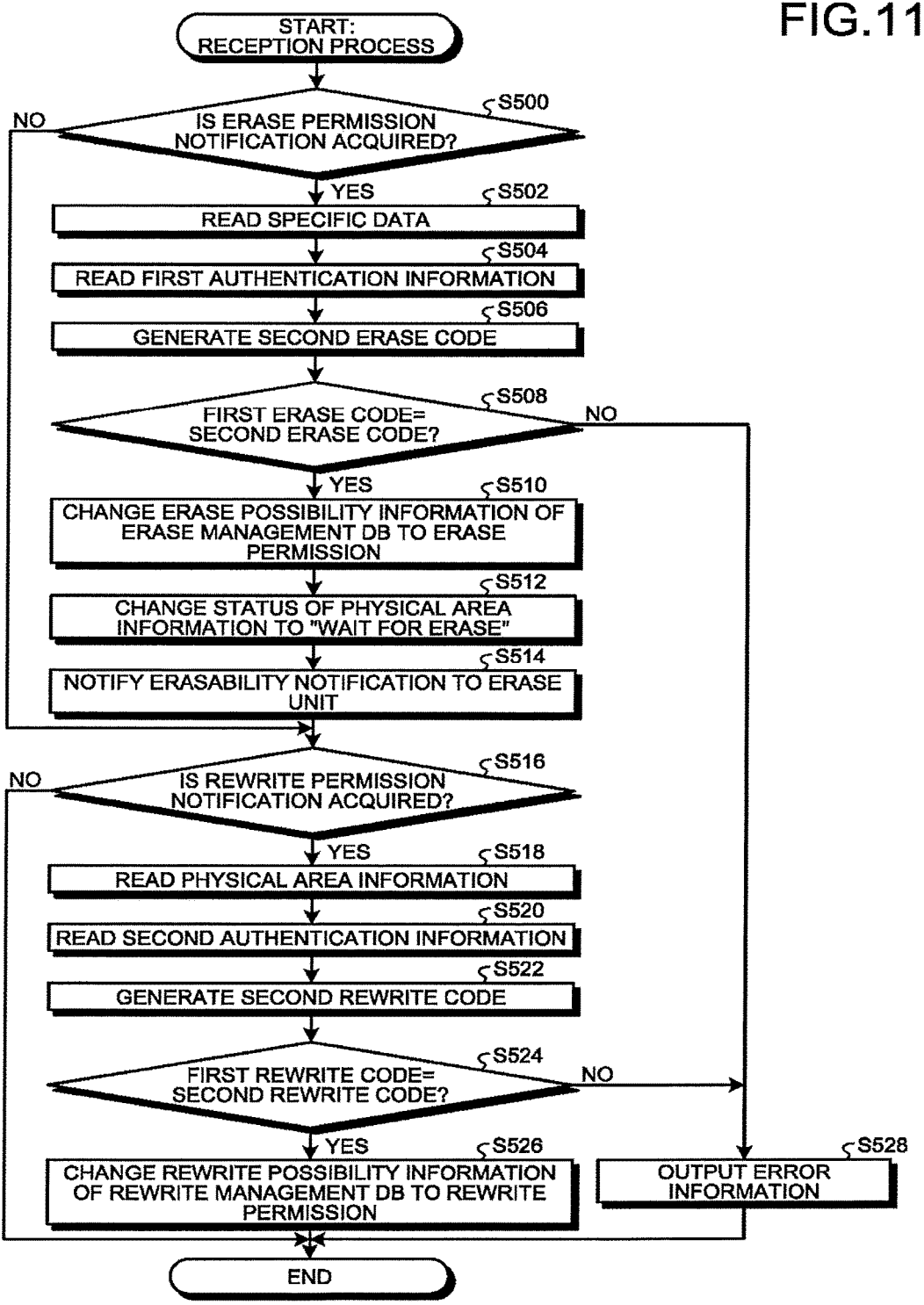
FIG. 11 is a flowchart of a procedure of a reception process.

Next, the reception process executed by the storage device 10 will be described. FIG. 11 is a flowchart illustrating the exemplary procedure of the reception process.

First, the acquisition unit 10A determines whether erase permission notification is acquired (Step S500). The acquisition unit 10A makes a determination in Step S500 by determining whether the erase permission notification received from the server device 20 via the host processor 14 and the network interface controller 16.

When a negative determination is made in Step S500 (Step S500: No), the process proceeds to Step S516 to be described later. On the other hand, when an affirmative determination is made in Step S500 (Step S500: Yes), the process proceeds to Step S502. In Step S502, the first generation unit 10B reads specific data from the data storage unit 30A (Step S502). The first generation unit 10B reads the data stored in the physical area, indicated by the physical area information included in the erase permission notification acquired in Step S500, from the data storage unit 30A as the specific data as the erase target.

Next, the first generation unit 10B reads the first authentication information from the authentication information storage unit 30D (Step S504). For example, the first generation unit 10B acquires a share code from the share code management DB 30I of the authentication information storage unit 30D. In addition, the first generation unit 10B acquires a transmission count corresponding to the physical area information included in the erase permission notification from the first transmission management DB 30J of the authentication information storage unit 30D. Then, the first generation unit 10B uses the acquired share code and transmission count as the first authentication information.

Next, the first generation unit 10B generates the second erase code using the specific data read in Step S502 and the first authentication information read in Step S504 (Step S506).

Next, the first generation unit 10B determines whether the first erase code included in the erase permission notification acquired in Step S500 matches the second erase code generated in Step S506 (Step S508). When it is determined that both the codes do not match each other (Step S508: No), the process proceeds to Step S528 to be described later.

On the other hand, when it is determined that both the codes match each other (Step S508: Yes), the process proceeds to Step S510. In Step S510, the change unit 10C changes the erase possibility information, which corresponds to the physical area information included in the erase permission notification acquired in Step S500, in the erase management DB 30H (see FIG. 4) to "erase permission" (Step S510). Next, the change unit 10C changes the status, which corresponds to the physical area information included in the erase permission notification acquired in Step S500, in the physical area management DB 30F (see FIG. 3B) to "wait for erase" (Step S512).

Then, the first generation unit 10B outputs the erasability notification to the erase unit 10D (Step S514).

Next, the acquisition unit 10A determines whether rewrite permission notification is acquired (Step S516). The acquisition unit 10A makes a determination in Step S516 by determining whether the rewrite permission notification is received from the server device 20 via the host processor 14 and the network interface controller 16.

When a negative determination is made in Step S516 (Step S516: No), this routine is ended. On the other hand, when an affirmative determination is made in Step S516 (Step S516: Yes), the process proceeds to Step S518.

In Step S518, the first generation unit 10B reads the physical area information corresponding to the logical area information included in the rewrite permission notification acquired in Step S516 from the correspondence relationship management DB 30E (see FIG. 3B) (Step S518).

Next, the first generation unit 10B reads the second authentication information from the authentication information storage unit 30D (Step S520).

Then, the first generation unit 10B generates the second rewrite code using the physical area information read in Step S518 and the second authentication information read in Step S520 (Step S522).

Next, the first generation unit 10B determines whether the first rewrite code included in the rewrite permission notification acquired in Step S516 matches the second rewrite code generated in Step S522 (Step S524).

When an affirmative determination is made in Step S524 (Step S524: Yes), the process proceeds to Step S526. In Step S526, the change unit 10C changes the rewrite possibility information, which corresponds to the logical area information included in the rewrite permission notification acquired in Step S516, in the rewrite management DB 30G (see FIG. 4) to "erase rewrite" (Step S526). Then, this routine is ended.

On the other hand, when a negative determination is made in Step S524 (Step S524: No), the process proceeds to Step S528. In Step S528, the first generation unit 10B notifies the server device 20 of error information indicating an error such as tampering and an attack via the host processor 14 and the network interface controller 16 (Step S528). Then, this routine is ended.

Figure 12:
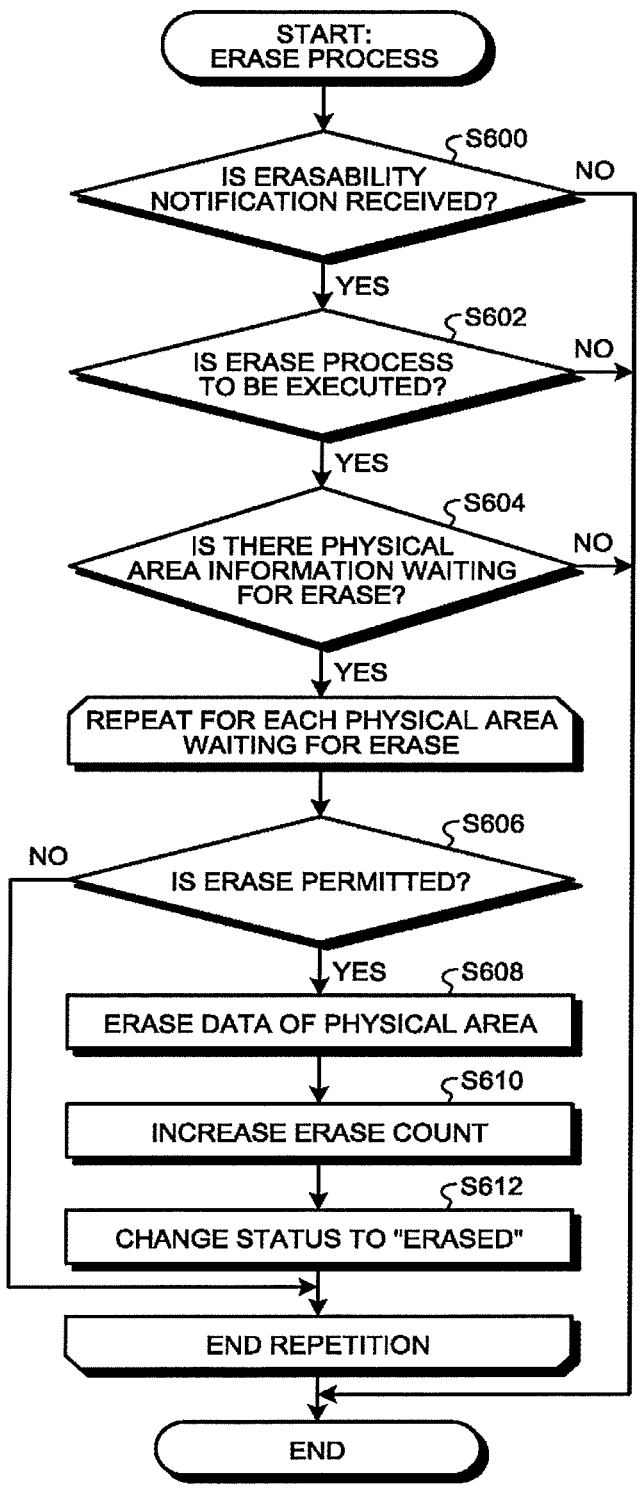
FIG. 12 is a flowchart of a procedure of an erase process.

Next, an exemplary procedure of the erase process executed by the storage device 10 will be described. FIG. 12 is a flowchart illustrating the exemplary procedure of the erase process.

First, the erase unit 10D determines whether erasability notification is received from the first generation unit 10B (Step S600). When a negative determination is made in Step S600 (Step S600: No), this routine is ended. On the other hand, when an affirmative determination is made in Step S600 (Step S600: Yes), the process proceeds to Step S602.

In Step S602, the erase unit 10D determines whether to perform the erase process (Step S602). For example, the erase unit 10D makes a determination in Step S602 by determining whether a predetermined condition is satisfied. The erase unit 10D determines that the predetermined condition is satisfied at a timing at which the performance of the read process or the write process that is being currently performed is not lowered. Examples of the predetermined condition include a condition that the number of pieces of physical area information with "erase permission" is a certain number or more, and the like. Incidentally, the storage device 10 may omit the process of Step S600 and repeat the processes of Steps S602 to S612 in this flowchart.

When an affirmative determination is made in Step S602 (Step S602: Yes), the process proceeds to Step S604. When a negative determination is made in Step S602 (Step S602: No), this routine is ended.

In Step S604, the erase unit 10D determines whether there is physical area information with the status "wait for erase" (Step S604). The erase unit 10D makes a determination in Step S604 by determining whether there is the physical area information with the status "wait for erase" in the physical area management DB 30F (see FIG. 3B).

When a negative determination is made in Step S604 (Step S604: No), this routine is ended. On the other hand, when an affirmative determination is made in Step S604 (Step S604: Yes), the erase unit 10D repeats the processes in Steps S604 to S612 for each of the physical areas with the status "wait for erase".

First, the erase unit 10D determines whether the corresponding erase possibility information in the erase management DB 30H (see FIG. 4) indicates "erase permission" for the physical area information with the status "wait for erase" (Step S606). When a negative determination is made in Step S606 (Step S606: No), the repetition processing is ended. On the other hand, when an affirmative determination is made in Step S606 (Step S606: Yes), the process proceeds to Step S608.

In Step S608, the erase unit 10D erases the data stored in the physical area indicated by the physical area information in the data storage unit 30A (Step S608).

Next, the erase unit 10D increases an erase count corresponding to physical area information indicating the erased physical area by "1" in the physical area management DB 30F (Step S610). Next, the erase unit 10D changes a status corresponding to the physical area information indicating the erased physical area in the physical area management DB 30F to "erased" (Step S612).

Then, the erase unit 10D repeats the processes of Steps S604 to S612 for each of the physical areas with the status "wait for erase", and then, this routine is ended.

Figure 13:
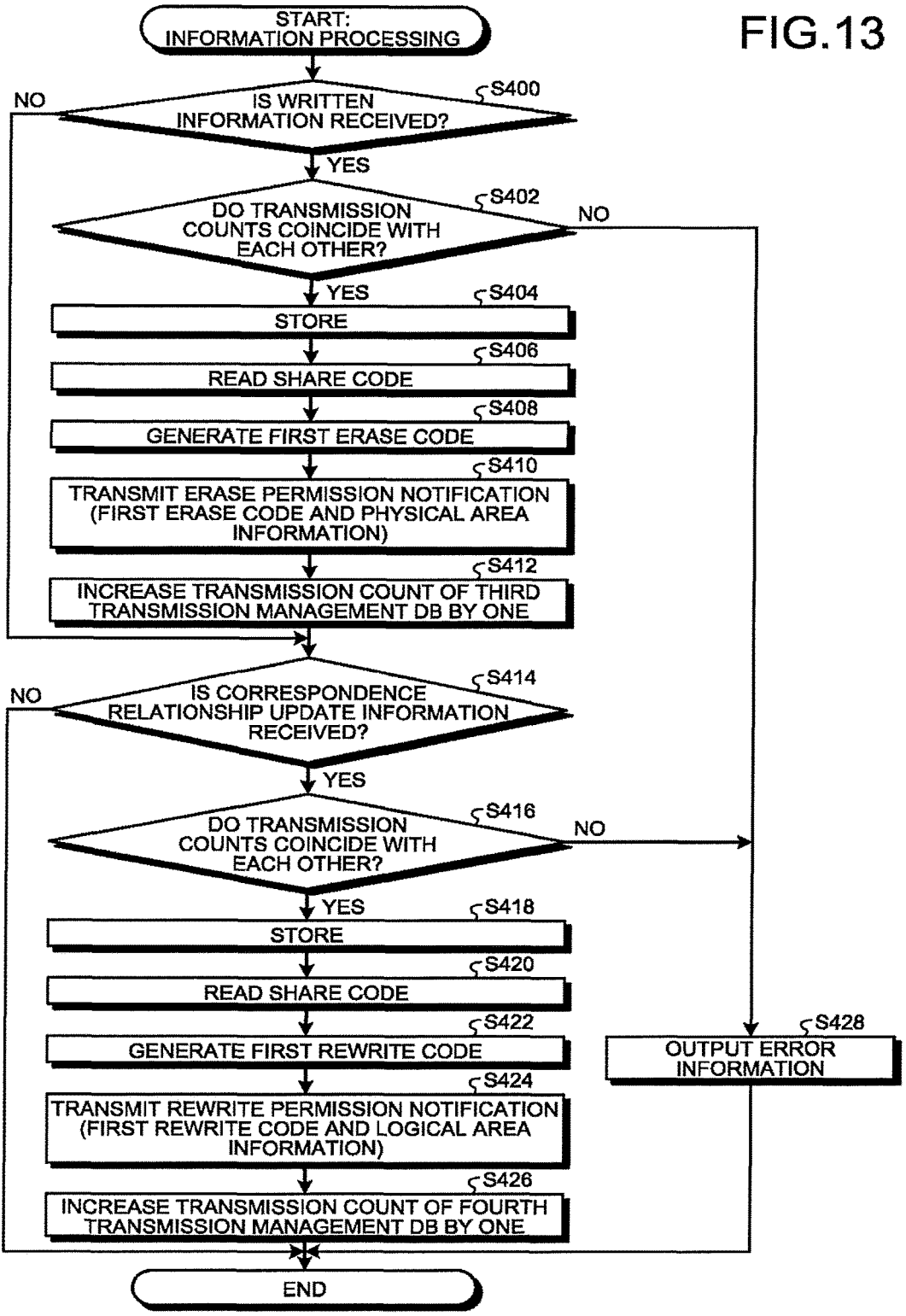
FIG. 13 is a flowchart of a procedure of information processing.

Next, a procedure of the information processing executed by the server device 20 will be described. FIG. 13 is a flowchart illustrating an exemplary procedure of the information processing executed by the server device 20.

First, the reception unit 24A of the server device 20 determines whether written information is received from the storage device 10 (Step S400). When a negative determination is made in Step S400 (Step S400: No), the process proceeds to Step S414 to be described later. When an affirmative determination is made in Step S400 (Step S400: Yes), the process proceeds to Step S402.

In Step S402, the reception unit 24A determines whether a transmission count of the written information included in the written information received in Step S400 matches a corresponding transmission count managed by the storage device 22 (Step S402).

When a negative determination is made in Step S402 (Step S402: No), the process proceeds to Step S429. In Step S428, the second transmission unit 24C outputs error information indicating possibility of an attack or tampering to an external device, an output device, the storage device 10, and the like via the network interface controller 26 (Step S428). The output device is, for example, a display device or a speaker. The external device is, for example, a device operated by an administrator. Then, this routine is ended.

On the other hand, when an affirmative determination is made in Step S402 (Step S402: Yes), the process proceeds to Step S404.

in Step S404, the reception unit 24A sores the written information received in Step S400 in the data storage unit 40A of the storage device 22 (Step S404). That is, the reception unit 24A registers a time at which the written information is received and the physical area information and data included in the written information in the written-information management DB 40C, which corresponds to a storage ID of the storage device 10 as a transmission source of the written information, in association with each other.

Next, the second generation unit 24B reads a share code, which corresponds to the storage ID of the storage device 10 as the transmission source of the written information received in Step S400, from the share code management DB 40E (see FIG. 7) (Step S406).

Next, the second generation unit 24B generates the first erase code with the predetermined specific algorithm using the data (specific data) included in the written information received in Step S400 and the first authentication information including the share code read in Step S406 and the transmission count (Step S408).

Next, the second transmission unit 24C transmits erase permission notification, which includes the first erase code generated in Step S408 and the physical area information included in the written information received in Step S400, to the storage device 10 as the transmission source of the written information (Step S410).

Next, the second transmission unit 24C increases a transmission count, which corresponds to the physical area information included in the erase permission notification in the third transmission management DB 40F corresponding to the storage ID of the storage device 10 that has transmitted the erase permission notification in Step S410, by "1" in the authentication information storage unit 40B (Step S412). Then, the process proceeds to Step S414.

In Step S414, the reception unit 24A determines whether correspondence relationship update information is received from the storage device 10 (Step S414). When a negative determination is made in Step S414 (Step S414: No), this routine is ended. When an affirmative determination is made in Step S414 (Step S414: Yes), the process proceeds to Step S416.

In Step S416, the reception unit 24A determines whether a transmission count of the correspondence relationship update information included in the correspondence relationship update information received in Step S414 matches a corresponding transmission count managed by the storage device 22 (Step S416). When a negative determination is made in Step S416 (Step S416: No), the process proceeds to Step S428. On the other hand, when an affirmative determination is made in Step S416 (Step S416: Yes), the process proceeds to Step S418.

In Step S418, the reception unit 24A stores the correspondence relationship update information received in Step S414 in the data storage unit 40A of the storage device 22 (Step S418). The reception unit 24A registers a time at which the correspondence relationship update information is received and the logical area information and physical area information included in the correspondence relationship update information in the correspondence relationship management DB 40D, which corresponds to a storage ID of the storage device 10 as a transmission source of the correspondence relationship update information received in Step S414, in association with each other.

Next, the second generation unit 24B reads a share code, which corresponds to the storage ID of the storage device 10 as the transmission source of the correspondence relationship update information received in Step S414, from the share code management DB 40E (see FIG. 7) (Step S420).

Next, the second generation unit 24B generates the first rewrite code based on the physical area information included in the correspondence relationship update information received in Step S414 and the second authentication information including the share code and the transmission count read in Step S420 (Step S422).

Next, the second transmission unit 24C transmits rewrite permission notification, which includes the first rewrite code generated in Step 3422 and the logical area information included in the correspondence relationship update information received in Step S414, to the storage device 10 as the transmission source of the correspondence relationship update information (Step S424).

Next, the second generation unit 24B increases a transmission count corresponding to the logical area information included in the correspondence relationship update information by "1" in the fourth transmission management DB 40G (Step S426). The fourth transmission management DB 40G is the fourth transmission management DB 40G corresponding to a storage ID of the storage device 10 as a transmission destination of the rewrite permission notification in Step S424 in the authentication information storage unit 40B. Then, this routine is ended.

As described above, the storage device 10 of the present embodiment includes the acquisition unit 10A, the first generation unit 10B, and the erase unit 10D. The acquisition unit 10A acquires the erase permission notification. The erase permission notification includes the first erase code and the physical area information. The first erase code is the code configured to erase the specific data and is the code that is generated based on the specific data and the first authentication information configured to authenticate the specific data. The physical area information indicates the physical area of the specific data. The first generation unit 10B generates the second erase code using the specific data stored in the physical area indicated by the physical area information and the first authentication information. When the first erase code corresponds to the second erase code, the erase unit 10D erases the data stored in the physical area indicated by the physical area information.

As described above, when the second erase code generated based on the specific data stored in a physical area as an erase target of the storage device 10 and the first authentication information corresponds the first erase code acquired from the server device 20, the storage device 10 of the present embodiment erases data stored in the physical area. That is, the storage device 10 requires the erase permission notification acquired from the outside for erasing of data. Then, when the first erase code included in the erase permission notification corresponds to the second erase code generated on the side of the storage device 10, the storage device 10 erases the specific data indicated by the erase permission notification from the storage device 10.

Thus, the storage device 10 of the present embodiment can suppress the data stored in the storage device 10 from being erroneously updated or erased due to vulnerability of the program executed by the host processor 14 of the vehicle 2.

Therefore, the storage device 10 of the present embodiment can preserve the data of the storage device 10.

In addition, the server device 20 stores the written information and the correspondence relationship update information received from the storage device 10. Then, the server device 20 transmits the erase permission notification and the rewrite permission notification to the storage device 10 according to the stored written information and correspondence relationship update information.

In this manner, the data of the storage device 10 is uploaded to the server device 20 so that the data can be preserved.

(Modification)

Incidentally, a communication path between the vehicle (the storage device 10) and the server device 20 may be encrypted by transport layer security (TLS). In addition, when authentication of a server is performed, a server certificate is authenticated by certificate authorities in advance. Then, the authentication information storage unit 40B of the server device 20 further stores the server certificate and a server secret key. The authentication information storage unit 30D of the storage device 10 may further store a root certificate in advance. In addition, authentication of a client may be also performed using a client certificate in the same manner.

Incidentally, the description has been given in the above-described embodiment by exemplifying the case where the physical area indicates the physical block and the physical area information indicates the physical block number. In addition, the description has been given in the above-described embodiment by exemplifying the case where the logical area information indicates the logical block number.

Thus, the description has been given in the above-described embodiment with the example in which the erasing of the block and rewriting of the correspondence relationship management DB 30E (see FIG. 3B) are permitted in units of blocks as erase units of the NAND flash memory.

However, the physical area may indicate the physical page, and the physical area information may indicate the physical page number as described above. In this case, it is possible to manage the erasing and the rewriting of the correspondence relationship management DB 30E (see FIG. 3B) in units of pages as write/read units of the NAND flash memory. In the case of management in units of pages, the erasing of a block may be performed by moving data such that pages set to "erase permission" are gathered to perform erasing in units of blocks. Information on this movement of data may also be transmitted as the correspondence relationship update information.

In addition, the mode in which the correspondence relationship management DB 30E is managed within the storage device 10 has been illustrated in the above-described embodiment. However, the correspondence relationship management DE 30E may be managed by the host processor 14 side such as an Open Channel SSD.

In addition, the single storage device 10 is provided for the single vehicle 2 in the above-described embodiment. However, the single vehicle 2 may be provided with a plurality of the storage devices 10. In this case, each piece of information may be managed for each of storage IDs of the storage devices 10 in the storage system 1.

In addition, the erasing and rewriting control is performed for the entire storage device 10 in the above-described embodiment. However, the erasing and rewriting control may be performed for a part of the storage device 10.

In addition, the mode in which the storage device 10 transmits both the written information and the correspondence relationship update information to the server device 20 has been described in the above-described embodiment. However, the storage device 10 may transmit one of the written information and the correspondence relationship update information to the server device 20.

For example, there is a case where the writing of data occurs only sequentially in the storage device 10. For example, in the case of writing of log data, the writing of data occurs only sequentially. In such a case, logical area information such as a logical block number just increases simply. Thus, in this case, the storage device 10 may transmit only the written information to the server device 20.

In addition, the first generation unit 10B generates the second erase code or the second rewrite code using the specific data and the first authentication information when receiving the erase permission notification or the rewrite permission notification in the above-described embodiment, but may store the second erase code or the second rewrite code in advance at the time of generating the written information or the correspondence relationship update information and determine correspondence between codes using the stored second erase code or second rewrite code when receiving the erase permission notification or the rewrite permission notification.

(Hardware Configuration)

Figure 14:
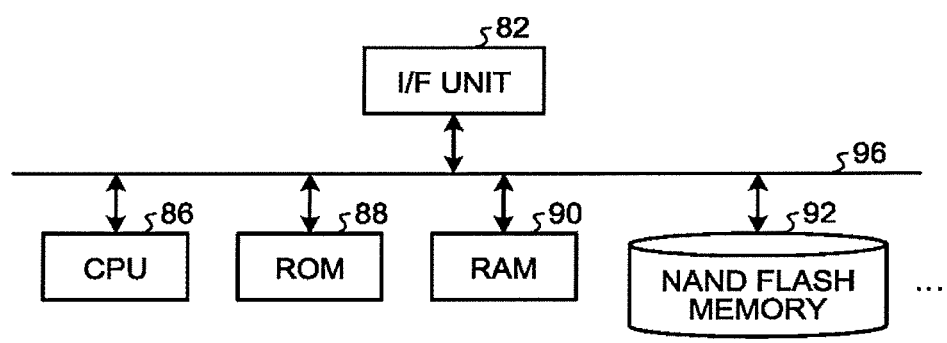
FIG. 14 is a hardware configuration diagram of a storage device.

Next, an example of a hardware configuration of the storage device 10 of the above-described embodiment will be described. FIG. 14 is an example of a hardware configuration diagram of the storage device 10 according to the above-described embodiment.

The storage device 10 according to the above-described embodiment has the hardware configuration which includes a control device such as a CPU 86, a read only memory (ROM) 88, a random access memory (RAM) 90, a NAND flash memory 92, an I/F unit 82 which is an interface between the host processor 14 and the storage device 10, and a bus 96 that connects the respective units. For example, the I/F unit provides an interface such as NVM Express to the host processor 14. In addition, the NAND flash memory 92 is connected by an interface such as Toggle DDR.

In the storage device 10 according to the above-described embodiment, the above-described units are realized on the storage device 10 as the CPU 86 reads a program from the ROM 88 onto the RAM 90 and executes the program. A part excluding the NAND flash memory 92 is also called a storage controller, and particularly an SSD controller in the case of an SSD.

Incidentally, the program (firmware) configured to execute the above-described respective processes executed by the storage device 10 of the above-described embodiment may be stored in the NAND flash memory 92. In addition, the program (firmware) configured to execute the above-described respective processes executed by the storage device 10 of the above-described embodiment may be provided in the state of being incorporated in the ROM 88 in advance.

In addition, the program configured to execute the above-described processes executed by the vehicle 2, the storage device 10 and the server device 20 of the above-described embodiment may be stored in a file of an installable format or an executable format in a computer-readable storage medium such as a CD-ROM, a CD-R, a memory card, a digital versatile disk (DVD), and a flexible disk (FD) and provided as a computer program product. In addition, the program configured to execute the above-described processes executed by the vehicle 2, the storage device 10 and the server device 20 of the above-described embodiment may be stored on a computer connected to a network such as the Internet and provided by being downloaded via the network. In addition, the program configured to execute the above-described processes executed by the vehicle 2, the storage device 10 and the server device 20 of the above-described embodiment may be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
   an acquisition unit configured to acquire erase permission notification which is generated based on specific data and first authentication information to authenticate the specific data, and includes a first erase code to erase the specific data and physical area information indicating a physical area of the specific data;
   a first generation unit configured to generate a second erase code using the specific data stored in the physical area indicated by the physical area information and the first authentication information; and
   an erase unit configured to erase data stored in the physical area indicated by the physical area information when the first erase code corresponds to the second erase code.

2. The storage device according to claim 1, wherein
   the acquisition unit acquires rewrite permission notification which is generated based on the physical area information and second authentication information to authenticate a correspondence relationship between the physical area information and logical area information, and includes a first rewrite code to rewrite rewrite possibility information indicating whether to permit rewriting of the physical area information in the correspondence relationship and the logical area information,
   the first generation unit generates a second rewrite code using the physical area information corresponding to the logical area information and the second authentication information, and
   the storage device includes:
   a change unit configured to change the rewrite possibility information of the physical area information in the correspondence relationship to rewrite permission when the first rewrite code corresponds to the second rewrite code; and
   a write unit configured to write data in a physical area when the rewrite possibility information of the physical area information corresponding to the logical area information of the data as a write target indicates rewrite permission, and rewrite the physical area information corresponding to the logical area information in the correspondence relationship to physical area information of the physical area in which the data is written.

3. The storage device according to claim 1, wherein the first authentication information includes:

at least one of a transmission count of the specific data to a server device and a share code assigned in advance to the storage device.

4. The storage device according to claim 2, wherein the second authentication information includes:
at least one of a transmission count of the correspondence relationship to a server device and a share code assigned in advance to the storage device.

5. The storage device according to claim 1, wherein the physical area information is:
a physical block number or a physical page number.

6. The storage device according to claim 2, wherein the logical area information is:
a logical block number or a logical page number.

7. A storage control method comprising:
   acquiring erase permission notification which is generated based on specific data and first authentication information to authenticate the specific data, and includes a first erase code to erase the specific data and physical area information indicating a physical area of the specific data;
   generating a second erase code using the specific data stored in the physical area indicated by the physical area information and the first authentication information; and
   erasing data stored in the physical area indicated by the physical area information when the firs* erase code corresponds to the second erase code.

8. A computer program product comprising a computer-readable medium including programmed instructions which, when executed by a computer, cause the computer to perform:
   acquiring erase permission notification which is generated based on specific data and first authentication information to authenticate the specific data, and includes a first erase code to erase the specific data and physical area information indicating a physical area of the specific data;
   generating a second erase code using the specific data stored in the physical area indicated by the physical area information and the first authentication information; and
   erasing data stored in the physical area indicated by the physical area information when the firs erase code corresponds to the second erase code.

9. A storage system comprising:
   a storage device; and
   a server device that communicates with the storage device, wherein
   the storage device includes:
   an acquisition unit configured to acquire erase permission notification which is generated based on specific data and first authentication information to authenticate the specific data, and includes a first erase code to erase the specific: data and physical area information indicating physical area of the specific data;
   a first generation unit configured to generate a second erase code using the specific data stored in the physical area indicated by the physical area information and the first authentication information; and
   an erase unit configured to erase data stored in the physical area indicated by the physical area information when the first erase code corresponds to the second erase code, and
   the server device includes:

a second generation unit configured to generate the first erase code based on the specific data and the first authentication information; and a second transmission unit configured to transmit the erase permission notification including the first erase code and the physical area information to the storage device.

10. The storage system according to claim 9, wherein the second generation unit of the server device further generates a first rewrite code to rewrite rewrite possibility information indicating whether to permit rewriting of the physical area information in a correspondence relationship based on the physical area information and second authentication information to authenticate the correspondence relationship between the physical area information and logical area information, and the second transmission unit of the server device further transmits:

rewrite permission notification including the first rewrite code and the logical area information.

* * * * *